US012471521B2

(12) United States Patent
Cline et al.

(10) Patent No.: US 12,471,521 B2
(45) Date of Patent: *Nov. 18, 2025

(54) ESTIMATING PERFORMANCE AND SELECTING OPERATING PARAMETERS FOR A FARMING MACHINE USING A CALIBRATION PASS

(71) Applicant: Deere & Company, Moline, IL (US)

(72) Inventors: Benjamin Kahn Cline, San Carlos, CA (US); Christopher Grant Padwick, Menlo Park, CA (US); Chia-Chun Fu, Sunnyvale, CA (US); Olgert Denas, San Jose, CA (US)

(73) Assignee: Deere & Company, Moline, IL (US)

( * ) Notice: Subject to any disclaimer, the term of this patent is extended or adjusted under 35 U.S.C. 154(b) by 212 days.

This patent is subject to a terminal disclaimer.

(21) Appl. No.: 18/217,296

(22) Filed: Jun. 30, 2023

(65) Prior Publication Data

US 2025/0000015 A1 Jan. 2, 2025

(51) Int. Cl.
*A01C 21/00* (2006.01)
*A01M 7/00* (2006.01)
(Continued)

(52) U.S. Cl.
CPC ......... *A01C 21/007* (2013.01); *A01M 7/0089* (2013.01); *G06V 20/188* (2022.01); *G06V 20/56* (2022.01)

(58) Field of Classification Search
CPC . A01C 21/007; A01M 7/0089; G06V 20/188; G06V 20/56
See application file for complete search history.

(56) References Cited

U.S. PATENT DOCUMENTS 10,255,670 B1\* 4/2019 Wu ................... H04N 7/183
11,093,745 B2\* 8/2021 Redden ............... G06V 20/188
(Continued)

FOREIGN PATENT DOCUMENTS

WO WO 2018/208947 A1 11/2018
WO WO 2021/102378 A1 5/2021

OTHER PUBLICATIONS

European Patent Office, Extended European Search Report, European Patent Application No. 24185415.7, Dec. 18, 2024, nine pages.

*Primary Examiner* — Calvin Cheung
(74) *Attorney, Agent, or Firm* — Fenwick & West LLP

(57) ABSTRACT

A method for calibrating performance characteristics of a farming machine using a performance report is described. The farming machine accesses images of plants in a field captured during the calibration pass. The images are input into a performance model to generate a performance report by identifying plants in the images using a plurality of identification sensitivities and determining expected performance characteristics of the farming machine for each of the identification sensitivities. As such, the performance report includes expected performance characteristics for each identification sensitives. The farming machine accesses a target performance characteristic (e.g., from an operator) for the farming machine corresponding identification sensitivity. Images are input into a plant identification model during a treatment pass which identify a plant in the field using the identification sensitivity corresponding to the target performance characteristic. The farming machine treats the plant in the field using a treatment array of the farming machine.

20 Claims, 9 Drawing Sheets

(51) Int. Cl.
  *G06V 20/10* (2022.01)
  *G06V 20/56* (2022.01)

(56) References Cited

U.S. PATENT DOCUMENTS

| | | |
|---|---|---|
| 11,367,207 B2 * | 6/2022 | Fu .................... A01M 7/0089 |
| 11,514,671 B2 | 11/2022 | Polzounov et al. |
| 11,580,718 B2 | 2/2023 | Padwick et al. |
| 2017/0219711 A1 * | 8/2017 | Redden ................ G06V 10/751 |
| 2021/0090274 A1 * | 3/2021 | Fu ......................... A01C 23/02 |
| 2022/0138464 A1 * | 5/2022 | Kwak ........................ B05B 1/20 |
| | | 239/1 |
| 2022/0172466 A1 | 6/2022 | Snyder et al. |
| 2022/0174934 A1 | 6/2022 | Germain |
| 2023/0011505 A1 | 1/2023 | Sibley et al. |
| 2023/0141050 A1 | 5/2023 | Sibley et al. |

* cited by examiner

ESTIMATING PERFORMANCE AND SELECTING OPERATING PARAMETERS FOR A FARMING MACHINE USING A CALIBRATION PASS

CROSS-REFERENCE TO RELATED APPLICATIONS FIELD

This application is related to U.S. patent application Ser. No. 18/217,294, filed Jun. 30, 2023, the disclosure of which is hereby incorporated by reference in its entirety.

BACKGROUND

Field of Disclosure

This disclosure relates generally to calibrating performance metrics of a farming machine treating plants in a field, and more specifically to modify models used to evaluate performance characteristics as the farming machine treats plants in the field.

Description of the Related Art

Agronomists have begun using autonomous and/or semi-autonomous configurations of farming machines to identify and treat plants in the field. Those solutions increasingly rely on computer models and machine vision to accomplish various tasks independently (e.g., applying treatments without input from the agronomist). Due to the increasing levels of autonomy, agronomists may feel like they lack the requisite control of their field and that the model may not be properly serving their interests. As such, some agronomists desire models configured for "human in the loop" decision making. That is, models where they may have insight into, and control over, the various decisions made by a farming machine's computer models. Given this, there is a need for models enabling autonomous or semi-autonomous farming solutions to allow for greater levels of human control. The methods presented herein describe a farming machine configured to adjust performance characteristics of a farming machine by tuning model parameters based on feedback from an operator.

SUMMARY

In some aspects, the techniques described herein relate to a method for calibrating performance characteristics of a farming machine as it travels through a field treating plants. The method may include inputting images captured by the farming machine as it travels through the field into a performance model. The performance model identifies plants in the images using an original identification sensitivity for the performance model and determines expected performance characteristics of the farming machine when treating plants identified in the images using the original identification sensitivity. The performance model accesses a target performance characteristic for the farming machine, and determines a modified identification sensitivity for the performance model that achieves the target performance characteristic. The method may include inputting additional images captured by the farming machine as it continues to travel through the field into the performance model. The performance model identifies a plant in the field using the modified identification sensitivity. The method includes treating the plant in the field using a treatment array of the farming machine.

In some implementations of the method, accessing target performance characteristics for the farming machine includes receiving the target performance characteristic from a manager of the farming machine before the farming machine travels through the field. The method may also include, as the farming machine travels through the field, autonomously determining the modified identification sensitivity that achieves the target performance characteristic and modifying the performance model to identify plants in images using modified identification sensitivity.

In some implementations of the method, accessing target performance characteristic for the farming machine includes displaying the expected performance characteristics on a display of the farming machine and receiving the target performance characteristic as an input from the display of the farming machine. The method may also include determining the modified identification sensitivity that achieves the target performance characteristic and modifying the performance model to identify plants in images using modified identification sensitivity.

In some implementations of the method, accessing target performance characteristic for the farming machine includes transmitting the expected performance characteristics to a remote system and receiving receiving the target performance characteristic from the remote system. The method may also include determining the modified identification sensitivity that achieves the target performance characteristic and modifying the performance model to identify plants in images using modified identification sensitivity.

In some implementations of the method, determining expected performance characteristics of the farming machine also includes determining an accuracy quantification for the original identification sensitivity and determining a chemical usage quantification for the original identification sensitivity.

In some implementations of the method, the accuracy quantification and the chemical usage quantification are based on a threshold number of images, the accuracy quantification and the chemical usage quantification are based on an area in the field where the images were captured, the accuracy quantification and the chemical usage quantification are based on plants identified with low accuracy.

In some implementations of the method, determining expected performance characteristics of the farming machine for each of the original identification sensitivity includes determining an economic quantification for the original identification sensitivity.

In some implementations of the method, the performance model identifies plants in images using a first model and determines the expected performance characteristics for the farming machine using a second model.

In some implementations of the method, the performance model includes a convolutional neural network including a single encoder to encode images onto a latent layer of the convolutional neural network; a first decoder to decode the latent layer to identify plants; and a second decoder to decode the latent layer to determine the expected performance characteristics.

In some implementations of the method, the method includes determining the expected performance characteristics of the farming machine when treating plants identified in the images using the original identification sensitivity are less than a threshold performance characteristic. The method additionally includes, in response to determining the expected performance characteristics are less than the threshold performance characteristic, transmitting a notification to a manager of the farming machine indicating the expected performance characteristics.

In some implementations of the method, the method further includes determining a recommendation including the target performance characteristic based on the expected performance characteristics for the original identification sensitivity and the threshold performance characteristic. In this case, the notification may include the recommendation.

In some aspects, the techniques described herein relate to a method for calibrating performance characteristics of a farming machine using a performance report. The method includes accessing images of plants in a field captured during a calibration pass of the farming machine through the field. The images are input into a performance model to generate a performance report. To generate the performance report, the performance model is trained to identify plants in the images using a plurality of identification sensitivities and determine expected performance characteristics of the farming machine for each of the plurality of identification sensitivities. As such, the performance report includes expected performance characteristics for each of the plurality of identification sensitives. The method also includes accessing a target performance characteristic for the farming machine from the performance report, where the target performance characteristic is an expected performance characteristic and its corresponding identification sensitivity. The method also includes inputting, into a plant identification model, additional images of plants in the field captured during a treatment pass of the farming machine through the field. The plant identification model is configured to identify a plant in the field using the identification sensitivity corresponding to the target performance characteristic. The method also includes treating the plant in the field using a treatment array of the farming machine.

In some implementations of the method, determining performance characteristics of the farming machine includes inputting the images into a principal identification model configured to identify plants in the images at a principal identification sensitivity. For each of the plurality of identification sensitivities of the plurality, the method includes inputting the images into a secondary identification model configured to identify plants in the images at the identification sensitivity and determining the expected performance characteristics of the farming machine for the identification sensitivity by comparing the plants identified by the principal identification model at the principal identification sensitivity and the plants identified by the secondary identification model at the identification sensitivity.

In some implementation of the model, the plant identification model and the secondary identification model may be a same model. Additionally, the principal identification sensitivity of the principal identification model may identify plants at a first fidelity and the plurality of identification sensitivities may identify plants at a plurality of second fidelities where each of the plurality of second fidelities lower than the first fidelity.

In some implementations of the method, the principal identification model is configured to identify plants within a first time and the secondary identification model is configured to identify plants within a second time less than the first time. In some cases, the first time is longer than a processing time, the second time is shorter than the processing time, and the processing time quantifies an expected time between identifying a plant in an image and a farming machine treating the plant as the farming machine travels in the field.

In some implementations of the method, accessing the target performance characteristic for the farming machine also includes displaying, on a user interface of the farming machine, the performance report including expected performance characteristics of the farming machine for each of the plurality of identification sensitives. The method also includes receiving, from the user interface of the farming machine, the target performance characteristic, wherein the target performance characteristic is one of the expected performance characteristics in the performance report.

In some implementations of the method, accessing the target performance characteristics for the farming machine also includes transmitting, to a client device, the performance report including expected performance characteristics of the farming machine for each of the plurality of identification sensitives. The method also includes receiving, from client device, the target performance characteristic, wherein the target performance characteristic is one of the expected performance characteristics in the performance report.

In some implementations of the method, determining expected performance characteristics of the farming machine for each of the plurality of identification sensitivities includes, for each of the plurality of identification sensitivities, determining an accuracy quantification for the identification sensitivity and determining a chemical usage quantification for the identification sensitivity.

In some implementations of the method, determining expected performance characteristics of the farming machine for each of the plurality of identification sensitivities includes, for each of the plurality of identification sensitivities, determining an economic quantification for the identification sensitivity.

In some implementations of the method, the method also includes receiving, at a remote system, the images of plants in the field captured during the calibration pass of the farming machine through the field, where generating the performance report using the performance model occurs at the remote system.

In some implementations of the method, generating the performance report further includes generating the performance report by processing the images using a processor on the farming machine and transmitting a notification to the operator of the farming machine that the performance report is complete.

The methods described above may be implemented by a farming machine including detection mechanisms, treatment mechanism, a processor, and a computer-readable storage medium storing computer program instructions for executing the method. The methods described above may be implemented by a processor executing computer program instructions stored on a non-transitory computer readable storage medium.

Figure 1A:
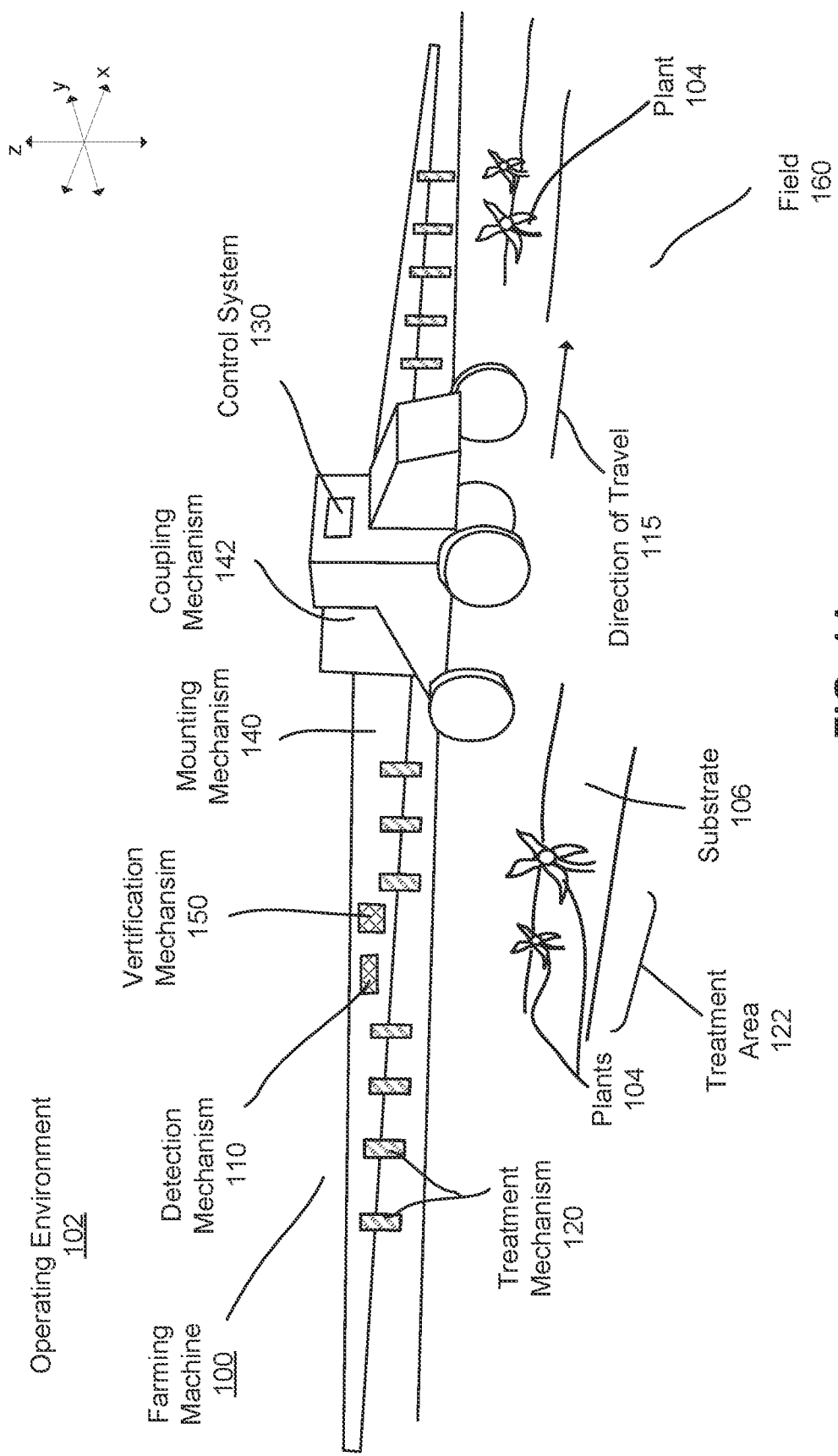
FIG. 1A is an isometric view of a farming machine that performs farming actions of a treatment plan, according to one example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

Agronomists may use farming machines to treat plants in a field. The farming machines are equipped with treatment mechanisms to apply treatments to the plants. Treatments include, for example, growth regulators (e.g., pesticide, insecticide, herbicide, etc.) or promoters (e.g., fertilizers) to the plants. Fields often contain more than one crop, as well as undesirable plants, like weeds, each of which may require different types of treatment.

As the farming machines move towards autonomous or semi-autonomous configurations, the farming machines increasingly rely on computer models and machine vision to accomplish various tasks independently (e.g., applying treatments without input from the agronomist). In some cases, model autonomy causes agronomists to feel like they lack the requisite control of their field, and those agronomists desire models configured for "human in the loop" decision making. That is, the agronomists want insight into, and control over, the various decisions made by a farming machine's computer models.

To provide an example, consider a farming machine configured to identify and treat weeds in the field using a plant identification model. In this example, the plant identification model operates in a largely opaque manner, identifying plants in the field according to some internal setting such that there is not visibility into how well the model is performing in the field. This non-visibility into the model and corresponding lack of control can be detrimental to agronomists seeking to have a greater control over operations in the field, for example, by tuning how aggressively the farming machine treats weeds in a field full of crops.

The methods presented herein describe a farming machine configured to adjust performance characteristics as it travels through the field. The farming machine may be configured to adjust performance in real-time, either immediately before a farming pass or during a farming pass, or adjust performance using a calibration pass that occurs before a farming pass. In either case, the farming machine captures images plants in the field, identifies plants in the image, calculates performance characteristics, accesses target performance characteristics, and modifies models to achieve the target performance characteristics. The farming machine includes a number of treatment mechanisms, such as nozzles, such that the farming machine can treat identified plants using the modified models. Actively tuning performance characteristics as the farming machine operates in the field allows an agronomist to tune the performance of the farming machine according to their farming objective.

II. Field Management

Agricultural managers ("managers") are responsible for managing farming operations in one or more fields. Managers work to implement a farming objective within those fields and select from among a variety of farming actions to implement that farming objective. Traditionally, managers are, for example, a farmer or agronomist that works the field but could also be other people and/or systems configured to manage farming operations within the field. For example, a manager could be an automated farming machine, a machine learned computer model, etc. In some cases, a manager may be a combination of the managers described above. For example, a manager may include a farmer assisted by a machine learned agronomy model and one or more automated farming machines or could be a farmer and an agronomist working in tandem.

Managers implement one or more farming objectives for a field. A farming objective is typically a macro-level goal for a field. For example, macro-level farming objectives may include treating crops with growth promoters, neutralizing weeds with growth regulators, harvesting a crop with the best possible crop yield, or any other suitable farming objective. However, farming objectives may also be a micro-level goal for the field. For example, micro-level farming objectives may include treating a particular plant in the field, repairing or correcting a part of a farming machine, requesting feedback from a manager, etc. Of course, there are many possible farming objectives and combinations of farming objectives, and the previously described examples are not intended to be limiting.

Farming objectives are accomplished by one or more farming machines performing a series of farming actions. Farming machines are described in greater detail below. Farming actions are any operation implementable by a farming machine within the field that works towards a farming objective. Consider, for example, a farming objective of harvesting a crop with the best possible yield. This farming objective requires a litany of farming actions, e.g., planting the field, fertilizing the plants, watering the plants, weeding the field, harvesting the plants, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers implement a treatment plan in the field to accomplish a farming objective. A treatment plan is a hierarchical set of macro-level and/or micro-level objectives that accomplish the farming objective of the manager. Within a treatment plan, each macro or micro-objective may require a set of farming actions to accomplish, or each macro or micro-objective may be a farming action itself. So, to expand, the treatment plan is a temporally sequenced set of farming actions to apply to the field that the manager expects will accomplish the farming objective.

When executing a treatment plan in a field, the treatment plan itself and/or its constituent farming objectives and farming actions have various results. A result is a representation as to whether, or how well, a farming machine accomplished the treatment plan, farming objective, and/or farming action. A result may be a qualitative measure such as "accomplished" or "not accomplished," or may be a quantitative measure such as "40 pounds harvested," or "1.25 acres treated." Results can also be positive or negative, depending on the configuration of the farming machine or the implementation of the treatment plan. Moreover, results can be measured by sensors of the farming machine, input by managers, or accessed from a datastore or a network.

Traditionally, managers have leveraged their experience, expertise, and technical knowledge when implementing farming actions in a treatment plan. In a first example, a manager may spot check weed pressure in several areas of the field to determine when a field is ready for weeding. In a second example, a manager may refer to previous implementations of a treatment plan to determine the best time to begin planting a field. Finally, in a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For instance, farming actions in a treatment plan have historically been applied to an entire field rather than small portions of a field. To illustrate, when a manager decides to plant a crop, she plants the entire field instead of just a corner of the field having the best planting conditions; or, when the manager decides to weed a field, she weeds the entire field rather than just a few rows. Similarly, each farming action in the sequence of farming actions of a treatment plan are historically performed at approximately the same time. For example, when a manager decides to fertilize a field, she fertilizes the field at approximately the same time; or, when the manager decides to harvest the field, she does so at approximately the same time. Additionally, fields may be any type of plant fields including, e.g., corn fields, rice paddies, orchards, etc.

Notably though, farming machines have greatly advanced in their capabilities. For example, farming machines continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of farming actions in a treatment plan. Instead, managers may leverage advanced capabilities of farming machines to implement treatment plans that are highly localized and determined by real-time measurements in the field. In other words, rather than a manager applying a "best guess" treatment plan to an entire field, they can implement individualized and informed treatment plans for each plant in the field.

III. Farming Machine

Overview

A farming machine that implements farming actions of a treatment plan may have a variety of configurations, some of which are described in greater detail below.

Figure 1B:
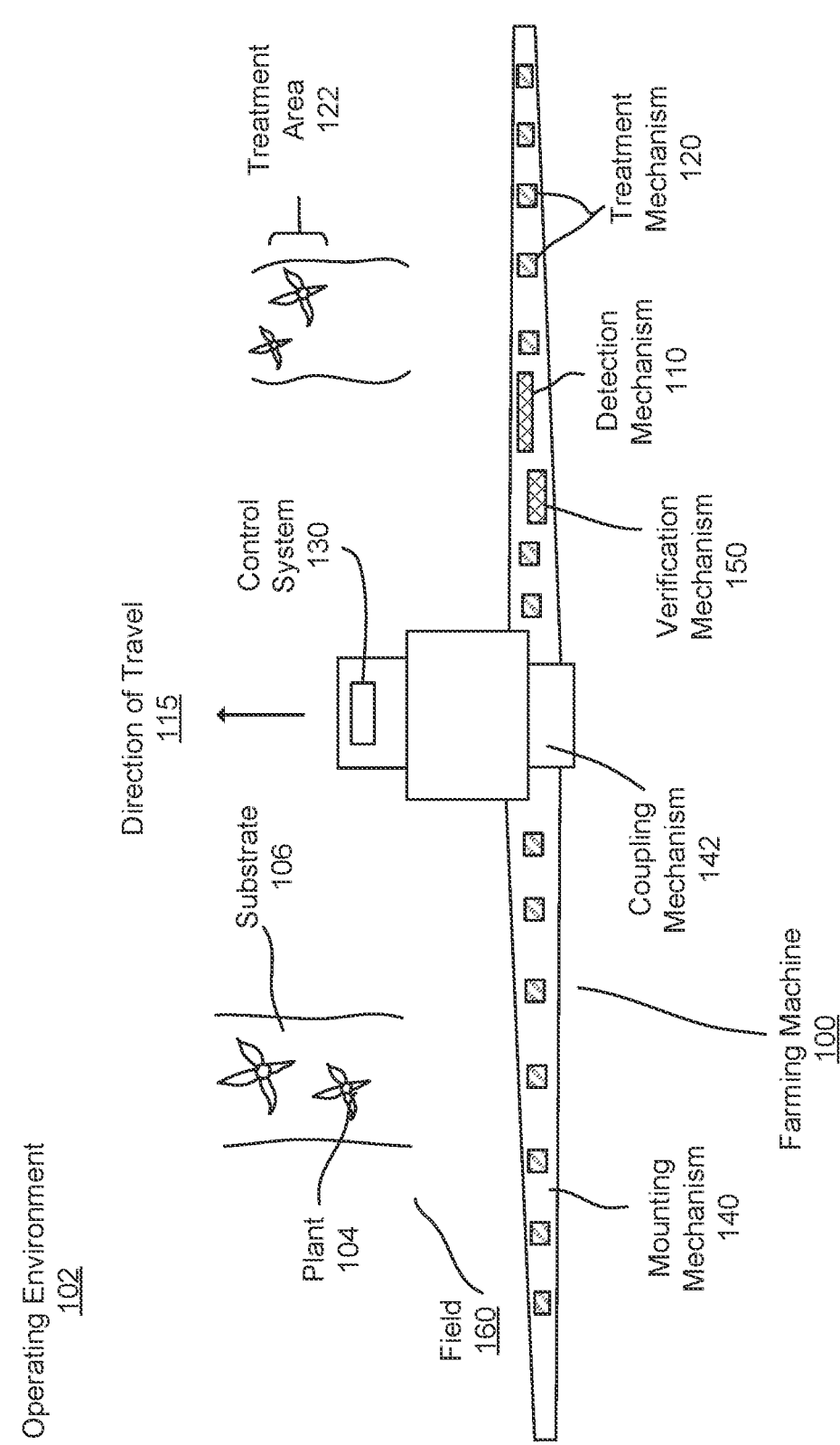
FIG. 1B is a top view of the farming machine in FIG. 1A, according to one example embodiment.
Figure 1C:
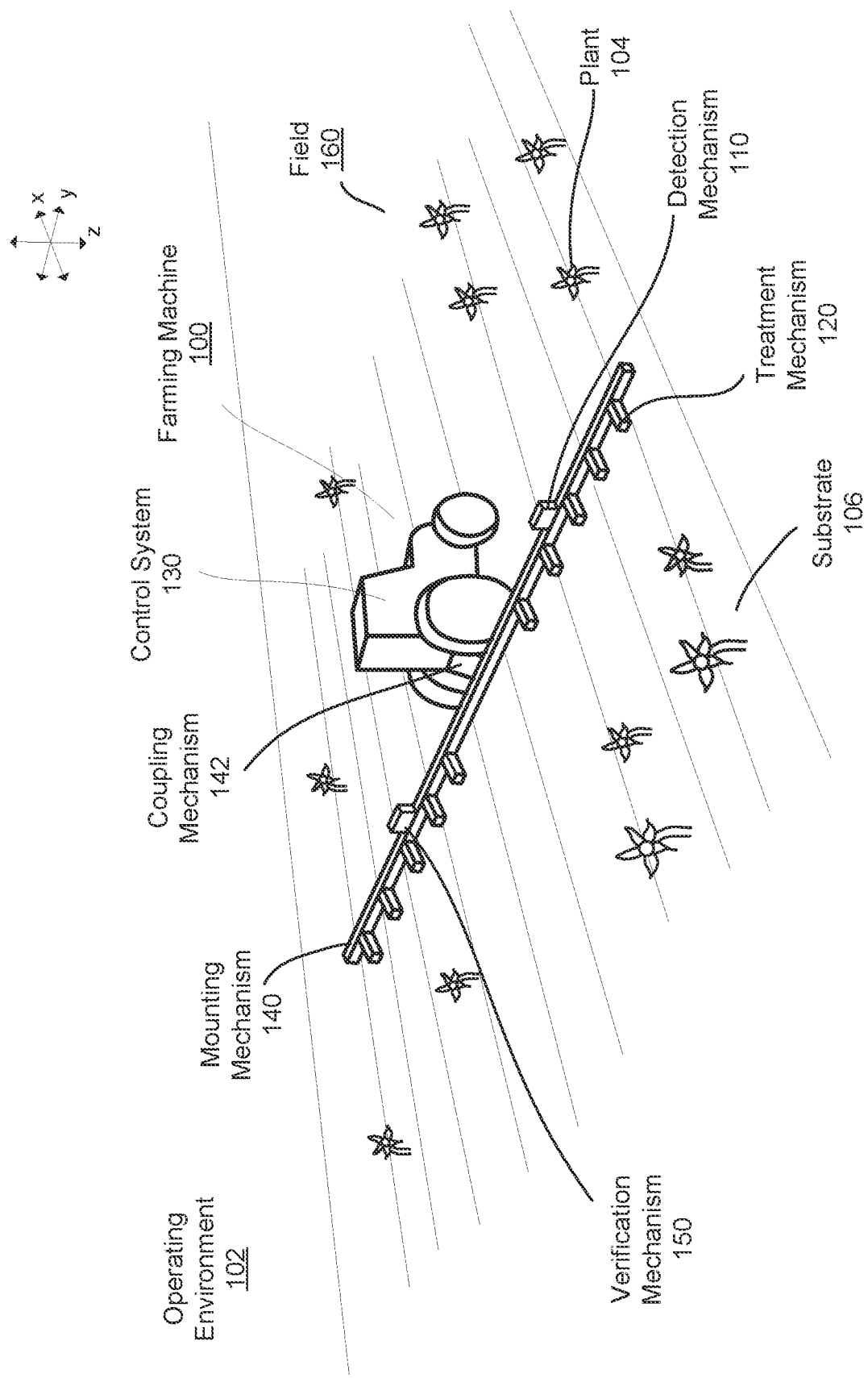
FIG. 1C is an isometric view of another farming machine that performs farming actions of a treatment plan, according to one example embodiment.

FIG. 1A is an isometric view of a farming machine 100 that performs farming actions of a treatment plan, according to one example embodiment, and FIG. 1B is a top view of the farming machine 100 in FIG. 1A. FIG. 1C is an isometric view of another farming machine 100 that performs farming actions of a treatment plan, according to one example embodiment.

The farming machine 100 includes a detection mechanism 110, a treatment mechanism 120, and a control system 130. The farming machine 100 can additionally include a mounting mechanism 140, a verification mechanism 150, a power source, digital memory, communication apparatus, or any other suitable component that enables the farming machine 100 to implement farming actions in a treatment plan. Moreover, the described components and functions of the farming machine 100 are just examples, and a farming machine 100 can have different or additional components and functions other than those described below.

The farming machine 100 is configured to perform farming actions in a field 160, and the implemented farming actions are part of a treatment plan. To illustrate, the farming machine 100 implements a farming action which applies a treatment to one or more plants 104 and/or the substrate 106 within a geographic area. Here, the treatment farming actions are included in a treatment plan to regulate plant growth. As such, treatments are typically applied directly to a single plant 104, but can alternatively be directly applied to multiple plants 104, indirectly applied to one or more plants 104, applied to the environment 102 associated with the plant 104 (e.g., soil, atmosphere, or other suitable portion of the plant's environment adjacent to or connected by an environmental factors, such as wind), or otherwise applied to the plants 104.

In a particular example, the farming machine 100 is configured to implement a farming action which applies a treatment that necroses the entire plant 104 (e.g., weeding) or part of the plant 104 (e.g., pruning). In this case, the farming action can include dislodging the plant 104 from the supporting substrate 106, incinerating a portion of the plant 104 (e.g., with directed electromagnetic energy such as a laser), applying a treatment concentration of working fluid (e.g., fertilizer, hormone, water, etc.) to the plant 104, or treating the plant 104 in any other suitable manner.

In another example, the farming machine 100 is configured to implement a farming action which applies a treatment to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or substrate 106, applying a disease treatment or insect treatment to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

Operating Environment

The farming machine 100 operates in an operating environment 102. The operating environment 102 is the environment 102 surrounding the farming machine 100 while it implements farming actions of a treatment plan. The operating environment 102 may also include the farming machine 100 and its corresponding components itself.

The operating environment 102 typically includes a field 160, and the farming machine 100 generally implements farming actions of the treatment plan in the field 160. A field 160 is a geographic area where the farming machine 100 implements a treatment plan. The field 160 may be an outdoor plant field but could also be an indoor location that houses plants such as, e.g., a greenhouse, a laboratory, a grow house, a set of containers, or any other suitable environment 102.

A field 160 may include any number of field portions. A field portion is a subunit of a field 160. For example, a field portion may be a portion of the field 160 small enough to include a single plant 104, large enough to include many plants 104, or some other size. The farming machine 100 can execute different farming actions for different field portions. For example, the farming machine 100 may apply an herbicide for some field portions in the field 160, while applying a pesticide in another field portion. Moreover, a field 160 and a field portion are largely interchangeable in the context of the methods and systems described herein. That is, treatment plans and their corresponding farming actions may be applied to an entire field 160 or a field portion depending on the circumstances at play.

The operating environment 102 may also include plants 104. As such, farming actions the farming machine 100 implements as part of a treatment plan may be applied to plants 104 in the field 160. The plants 104 can be crops but could also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 104 may include a stem that is arranged superior to (e.g., above) the substrate 106 and a root system joined to the stem that is located inferior to the plane of the substrate 106 (e.g., below ground). The stem may support any branches, leaves, and/or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the substrate 106. In various examples, the plant 104 may be a vascular plant 104, non-vascular plant 104, ligneous plant 104, herbaceous plant 104, or be any suitable type of plant 104.

Plants 104 in a field 160 may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within a field 160 may include the same type of crop (e.g., same genus, same species, etc.). For example, each field portion in a field 160 may include corn crops. However, the plants 104 within each field 160 may also include multiple crops (e.g., a first, a second crop, etc.). For example, some field portions may include lettuce crops while other field portions include pig weeds, or, in another example, some field portions may include beans while other field portions include corn. Additionally, a single field portion may include different types of crop. For example, a single field portion may include a soybean plant 104 and a grass weed.

The operating environment 102 may also include a substrate 106. As such, farming actions the farming machine 100 implements as part of a treatment plan may be applied to the substrate 106. The substrate 106 may be soil but can alternatively be a sponge or any other suitable substrate 106. The substrate 106 may include plants 104 or may not include plants 104 depending on its location in the field 160. For example, a portion of the substrate 106 may include a row of crops, while another portion of the substrate 106 between crop rows includes no plants 104.

III.A Example Machine Configurations

Detection Mechanism(s)

The farming machine 100 may include a detection mechanism 110. The detection mechanism 110 identifies objects in the operating environment 102 of the farming machine 100. To do so, the detection mechanism 110 obtains information describing the environment 102 (e.g., sensor or image data), and processes that information to identify pertinent objects (e.g., plants 104, substrate 106, persons, etc.) in the operating environment 102. Identifying objects in the environment 102 further enables the farming machine 100 to implement farming actions in the field 160. For example, the detection mechanism 110 may capture an image of the field 160 and process the image with a plant identification module to identify plants 104 in the captured image. The farming machine 100 then implements farming actions in the field 160 based on the plants 104 identified in the image.

The farming machine 100 can include any number or type of detection mechanism 110 that may aid in determining and implementing farming actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the detection mechanism 110 may include an array of sensors (e.g., an array of cameras) configured to capture information about the environment 102 surrounding the farming machine 100. For example, the detection mechanism 110 may include an array of cameras configured to capture an array of pictures representing the environment 102 surrounding the farming machine 100. The detection mechanism 110 may also be a sensor that measures a state of the farming machine 100. For example, the detection mechanism 110 may be a speed sensor, a heat sensor, or some other sensor that can monitor the state of a component of the farming machine 100. Additionally, the detection mechanism 110 may also be a sensor that measures components during implementation of a farming action. For example, the detection mechanism 110 may be a flow rate monitor, a grain harvesting sensor, a mechanical stress sensor etc. Whatever the case, the detection mechanism 110 senses information about the operating environment 102 (including the farming machine 100).

A detection mechanism 110 may be mounted at any point on the mounting mechanism 140. Depending on where the detection mechanism 110 is mounted relative to the treatment mechanism 120, one or the other may pass over a geographic area in the field 160 before the other. For example, the detection mechanism 110 may be positioned on the mounting mechanism 140 such that it traverses over a geographic location before the treatment mechanism 120 as the farming machine 100 moves through the field 160. In another example, the detection mechanism 110 is positioned to the mounting mechanism 140 such that the two traverse over a geographic location at substantially the same time as the farming machine 100 moves through the field. Similarly, the detection mechanism 110 may be positioned on the mounting mechanism 140 such that the treatment mechanism 120 traverses over a geographic location before the detection mechanism 110 as the farming machine 100 moves through the field 160. The detection mechanism 110 may be statically mounted to the mounting mechanism 140, or may be removably or dynamically coupled to the mounting mechanism 140. In other examples, the detection mechanism 110 may be mounted to some other surface of the farming machine 100 or may be incorporated into another component of the farming machine 100.

Verification Mechanism(s)

The farming machine 100 may include a verification mechanism 150. Generally, the verification mechanism 150 records a measurement of the operating environment 102 and the farming machine 100 may use the recorded measurement to verify or determine the extent of an implemented farming action (i.e., a result of the farming action).

To illustrate, consider an example where a farming machine 100 implements a farming action based on a measurement of the operating environment 102 by the detection mechanism 110. The verification mechanism 150 records a measurement of the same geographic area measured by the detection mechanism 110 and where farming machine 100 implemented the determined farming action. The farming machine 100 then processes the recorded measurement to determine the result of the farming action. For example, the verification mechanism 150 may record an image of the geographic region surrounding a plant 104 identified by the detection mechanism 110 and treated by a treatment mechanism 120. The farming machine 100 may apply a treatment detection algorithm to the recorded image to determine the result of the treatment applied to the plant 104.

Information recorded by the verification mechanism 150 can also be used to empirically determine operation parameters of the farming machine 100 that will obtain the desired effects of implemented farming actions (e.g., to calibrate the farming machine 100, to modify treatment plans, etc.). For instance, the farming machine 100 may apply a calibration detection algorithm to a measurement recorded by the farming machine 100. In this case, the farming machine 100 determines whether the actual effects of an implemented farming action are the same as its intended effects. If the effects of the implemented farming action are different than its intended effects, the farming machine 100 may perform a calibration process. The calibration process changes operation parameters of the farming machine 100 such that effects of future implemented farming actions are the same as their intended effects. To illustrate, consider the previous example where the farming machine 100 recorded an image of a treated plant 104. There, the farming machine 100 may apply a calibration algorithm to the recorded image to determine whether the treatment is appropriately calibrated (e.g., at its intended location in the operating environment 102). If the farming machine 100 determines that the farming machine 100 is not calibrated (e.g., the applied treatment is at an incorrect location), the farming machine 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the treatment mechanism 120 is positioned there between. In this configuration, the verification mechanism 150 traverses over a geographic location in the operating environment 102 after the treatment mechanism 120 and the detection mechanism 110. However, the mounting mechanism 140 can retain the relative positions of the system components in any other suitable configuration. In some configurations, the verification mechanism 150 can be included in other components of the farming machine 100.

The farming machine 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment 102 surrounding the farming machine 100. For example, the verification mechanism 150 may include an array of cameras configured to capture an array of pictures representing the operating environment 102.

Treatment Mechanism(s)

The farming machine 100 may include a treatment mechanism 120. The treatment mechanism 120 can implement farming actions in the operating environment 102 of a farming machine 100. For instance, a farming machine 100 may include a treatment mechanism 120 that applies a treatment to a plant 104, a substrate 106, or some other object in the operating environment 102. More generally, the farming machine 100 employs the treatment mechanism 120 to apply a treatment to a treatment area 122, and the treatment area 122 may include anything within the operating environment 102 (e.g., a plant 104 or the substrate 106). In other words, the treatment area 122 may be any portion of the operating environment 102.

When the treatment is a plant treatment, the treatment mechanism 120 applies a treatment to a plant 104 in the field 160. The treatment mechanism 120 may apply treatments to identified plants or non-identified plants. For example, the farming machine 100 may identify and treat a specific plant (e.g., plant 104) in the field 160. Alternatively, or additionally, the farming machine 100 may identify some other trigger that indicates a plant treatment and the treatment mechanism 120 may apply a plant treatment. Some example plant treatment mechanisms 120 include: one or more spray nozzles, one or more electromagnetic energy sources (e.g., a laser), one or more physical implements configured to manipulate plants, but other plant 104 treatment mechanisms 120 are also possible.

Additionally, when the treatment is a plant treatment, the effect of treating a plant 104 with a treatment mechanism 120 may include any of plant necrosis, plant growth stimulation, plant portion necrosis or removal, plant portion growth stimulation, or any other suitable treatment effect. Moreover, the treatment mechanism 120 can apply a treatment that dislodges a plant 104 from the substrate 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, and/or injects one or more working fluids into the substrate 106 adjacent to a plant 104 (e.g., within a threshold distance from the plant). Other plant treatments are also possible. When applying a plant treatment, the treatment mechanisms 120 may be configured to spray one or more of: an herbicide, a fungicide, insecticide, some other pesticide, or water.

When the treatment is a substrate treatment, the treatment mechanism 120 applies a treatment to some portion of the substrate 106 in the field 160. The treatment mechanism 120 may apply treatments to identified areas of the substrate 106, or non-identified areas of the substrate 106. For example, the farming machine 100 may identify and treat an area of substrate 106 in the field 160. Alternatively, or additionally, the farming machine 100 may identify some other trigger that indicates a substrate 106 treatment and the treatment mechanism 120 may apply a treatment to the substrate 106. Some example treatment mechanisms 120 configured for applying treatments to the substrate 106 include: one or more spray nozzles, one or more electromagnetic energy sources, one or more physical implements configured to manipulate the substrate 106, but other substrate 106 treatment mechanisms 120 are also possible.

Of course, the farming machine 100 is not limited to treatment mechanisms 120 for plants 104 and substrates 106. The farming machine 100 may include treatment mechanisms 120 for applying various other treatments to objects in the field 160. Depending on the configuration, the farming machine 100 may include various numbers of treatment mechanisms 120 (e.g., 1, 2, 5, 20, 60, etc.). A treatment mechanism 120 may be fixed (e.g., statically coupled) to the mounting mechanism 140 or attached to the farming machine 100. Alternatively, or additionally, a treatment mechanism 120 may be movable (e.g., translatable, rotatable, etc.) on the farming machine 100. In one configuration, the farming machine 100 includes a single treatment mechanism 120. In this case, the treatment mechanism 120 may be actuatable to align the treatment mechanism 120 to a treatment area 122. In a second variation, the farming machine 100 includes a treatment mechanism 120 assembly comprising an array of treatment mechanisms 120. In this configuration, a treatment mechanism 120 may be a single treatment mechanism 120, a combination of treatment mechanisms 120, or the treatment mechanism 120 assembly. Thus, either a single treatment mechanism 120, a combination of treatment mechanisms 120, or the entire assembly may be selected to apply a treatment to a treatment area 122. Similarly, either the single, combination, or entire assembly may be actuated to align with a treatment area, as needed. In some configurations, the farming machine 100 may align a treatment mechanism 120 with an identified object in the operating environment 102. That is, the farming machine 100 may identify an object in the operating environment 102 and actuate the treatment mechanism 120 such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

Control System(s)

The farming machine 100 includes a control system 130. The control system 130 controls operation of the various components and systems on the farming machine 100. For instance, the control system 130 can obtain information about the operating environment 102, processes that information to identify a farming action, and implement the identified farming action with system components of the farming machine 100.

The control system 130 can receive information from the detection mechanism 110, the verification mechanism 150, the treatment mechanism 120, and/or any other component or system of the farming machine 100. For example, the control system 130 may receive measurements from the detection mechanism 110 or verification mechanism 150, or information relating to the state of a treatment mechanism 120 or implemented farming actions from a verification mechanism 150. Other information is also possible.

Similarly, the control system 130 can provide input to the detection mechanism 110, the verification mechanism 150, and/or the treatment mechanism 120. For instance, the control system 130 may be configured to input and control operating parameters of the farming machine 100 (e.g., speed, direction). Similarly, the control system 130 may be configured to input and control operating parameters of the detection mechanism 110 and/or verification mechanism 150. Operating parameters of the detection mechanism 110 and/or verification mechanism 150 may include processing time, location and/or angle of the detection mechanism 110, image capture intervals, image capture settings, etc. Other inputs are also possible. Finally, the control system may be configured to generate machine inputs for the treatment mechanism 120. That is translating a farming action of a treatment plan into machine instructions implementable by the treatment mechanism 120.

The control system 130 can be operated by a user operating the farming machine 100, wholly or partially autonomously, operated by a user connected to the farming machine 100 by a network, or any combination of the above. For instance, the control system 130 may be operated by an agricultural manager sitting in a cabin of the farming machine 100, or the control system 130 may be operated by an agricultural manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the farming machine 100 and connected by a local area network. In another example, the control system 130 may be a series of computers implemented on the farming machine 100, in the cloud, a client device and connected by a wireless area network.

The control system 130 can apply one or more computer models to determine and implement farming actions in the field 160. For example, the control system 130 can apply a plant identification model to images acquired by the detection mechanism 110 to determine and implement farming actions. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 may additionally include a communication apparatus, which functions to communicate (e.g., send and/or receive) data between the control system 130 and a set of remote devices.

The communication apparatus can be a Wi-Fi communication system, a cellular communication system, a short-range communication system (e.g., Bluetooth, NFC, etc.), or any other suitable communication system.

Other Machine Components

In various configurations, the farming machine 100 may include any number of additional components.

For instance, the farming machine 100 may include a mounting mechanism 140. The mounting mechanism 140 provides a mounting point for the components of the farming machine 100. That is, the mounting mechanism 140 may be a chassis or frame to which components of the farming machine 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150. In an example configuration, the mounting mechanism 140 extends outward from a body of the farming machine 100 such that the mounting mechanism 140 is approximately perpendicular to the direction of travel 115. In some configurations, the mounting mechanism 140 may include an array of treatment mechanisms 120 positioned laterally along the mounting mechanism 140. In some configurations, the farming machine 100 may not include a mounting mechanism 140, the mounting mechanism 140 may be alternatively positioned, or the mounting mechanism 140 may be incorporated into any other component of the farming machine 100. Additionally, the mounting mechanism 140 may be utilized for removably coupling various components of the farming machine 100. For example, the mounting mechanism 140 may be used to removably couple a detection mechanism from the farming machine.

The farming machine 100 may include locomoting mechanisms. The locomoting mechanisms may include any number of wheels, continuous treads, articulating legs, or some other locomoting mechanism(s). For instance, the farming machine 100 may include a first set and a second set of coaxial wheels, or a first set and a second set of continuous treads. In either example, the rotational axis of the first and second set of wheels/treads are approximately parallel. Further, each set is arranged along opposing sides of the farming machine 100. Typically, the locomoting mechanisms are attached to a drive mechanism that causes the locomoting mechanisms to translate the farming machine 100 through the operating environment 102. For instance, the farming machine 100 may include a drive train for rotating wheels or treads. In different configurations, the farming machine 100 may include any other suitable number or combination of locomoting mechanisms and drive mechanisms.

The farming machine 100 may also include one or more coupling mechanisms 142 (e.g., a hitch). The coupling mechanism 142 functions to removably or statically couple various components of the farming machine 100. For example, a coupling mechanism may attach a drive mechanism to a secondary component such that the secondary component is pulled behind the farming machine 100. In another example, a coupling mechanism may couple one or more treatment mechanisms 120 to the farming machine 100.

The farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

III.B System Environment

Figure 2:
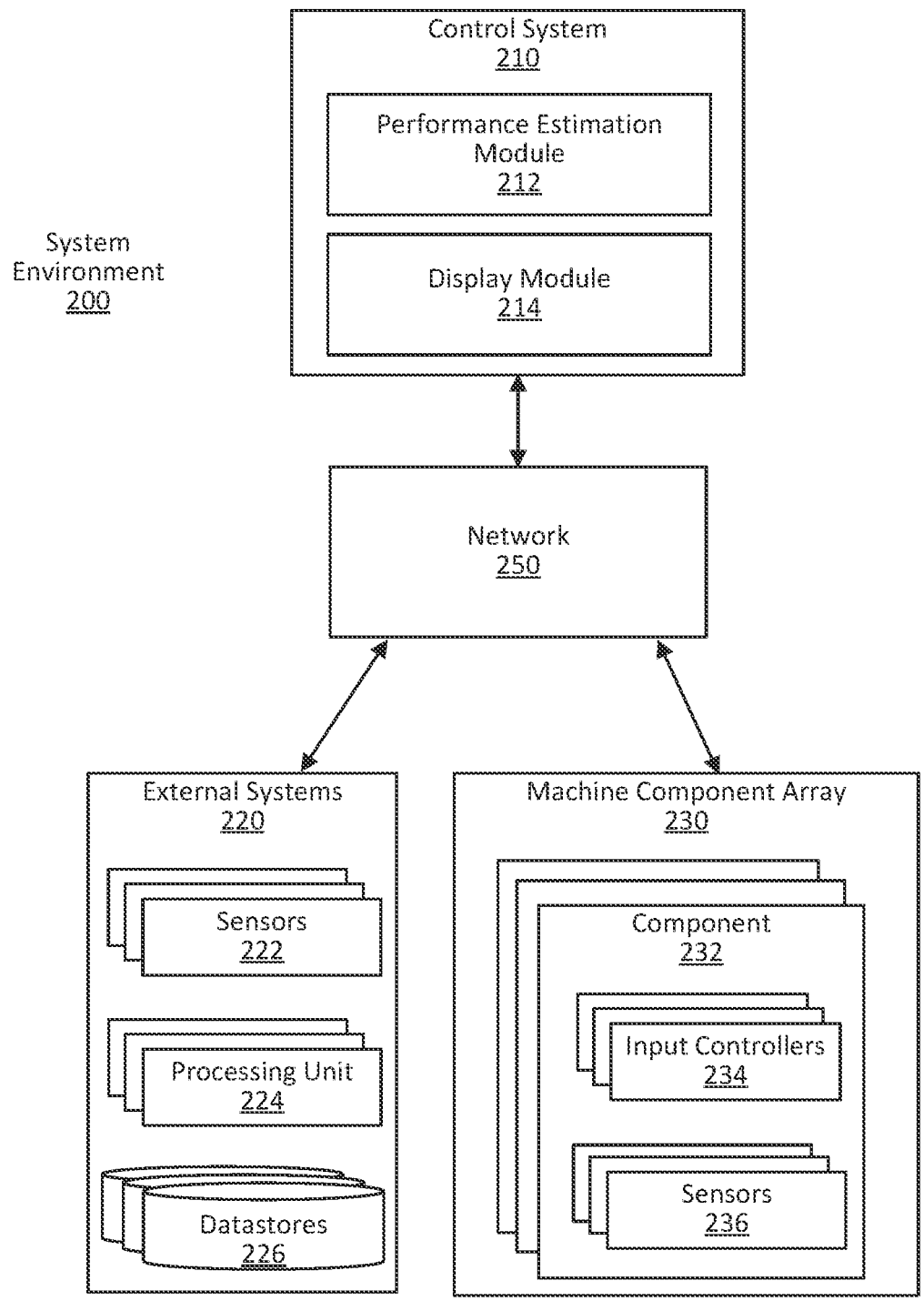
FIG. 2 is a block diagram of the system environment for the farming machine, in accordance with one or more example embodiments.

FIG. 2 is a block diagram of the system environment for the farming machine 100, in accordance with one or more example embodiments. In this example, a control system 210 (e.g., control system 130) is connected to external systems 220 and a machine component array 230 via a network 240 within the system environment 200.

The external systems 220 are any system that can generate data used to selecting treatments for plants 104 based on their identification. External systems 220 may include one or more sensors 222, one or more processing units 224, and one or more datastores 226. The one or more sensors 222 can measure the field 160, the operating environment 102, the farming machine 100, etc. and generate data representing those measurements. For instance, the sensors 222 may include a rainfall sensor, a wind sensor, heat sensor, a camera, etc. The processing units 2240 may process measured data to provide additional information that may aid in selecting treatments for plants 104. For instance, a processing unit 224 may access an image of a field 160 and calculate a weed pressure from the image or may access historical weather information for a field 160 to generate a forecast for the field. Datastores 226 store historical information regarding the farming machine 100, the operating environment 102, the field 160, etc. that may be beneficial in selecting treatments for plants 104 in the field 160. For instance, the datastore 226 may store results of previously implemented treatment plans and farming actions for a field 160, a nearby field, and or the region. The historical information may have been obtained from one or more farming machines (i.e., measuring the result of a farming action from a first farming machine with the sensors of a second farming machine). Further, the datastore 226 may store results of specific farming actions in the field 160, or results of farming actions taken in nearby fields having similar characteristics. The datastore 226 may also store historical weather, flooding, field use, planted crops, etc. for the field and the surrounding area. Finally, the datastores 226 may store any information measured by other components in the system environment 200.

The machine component array 230 includes one or more components 232. Components 222 are elements of the farming machine 100 that can take farming actions (e.g., a treatment mechanism 120). As illustrated, each component has one or more input controllers 234 and one or more sensors 236, but a component may include only sensors 236 or only input controllers 234. An input controller 234 controls the function of the component 232. For example, an input controller 234 may receive machine commands via the network 240 and actuate the component 232 in response. A sensor 236 generates data representing measurements of the operating environment 102 and provides that data to other systems and components within the system environment 200. The measurements may be of a component 232, the farming machine 100, the operating environment 102, etc. For example, a sensor 236 may measure a configuration or state of the component 232 (e.g., a setting, parameter, power load, etc.), measure conditions in the operating environment 102 (e.g., moisture, temperature, etc.), capture information representing the operating environment 102 (e.g., images, depth information, distance information), and generate data representing the measurement(s).

The control system 210 receives information from external systems 220 and the machine component array 230 and implements a treatment plan in the field 160 with the farming machine 100. Additionally, the control system 210 employs a performance estimation module 212 to adjust performance characteristics of a farming machine as it performs farming actions to facilitate implementation of a treatment plan and/or farming objective. To do so, the performance estimation module may capture images of plants in the field, identify plants in those images, calculate performance characteristics based on the plants identified in the images, and calibrate the farming machine to achieve target performance characteristics. Calibrating performance characteristics can be done in real-time on a farming pass of the farming machine 100, or after a calibration pass before a farming pass of the farming machine 100. The performance estimation module 212 is described in greater detail with respect to FIG. 3.

The network 240 connects nodes of the system environment 200 to allow microcontrollers and devices to communicate with each other. In some embodiments, the components are connected within the network as a Controller Area Network (CAN). In this case, within the network each element has an input and output connection, and the network 240 can translate information between the various elements. For example, the network 240 receives input information from the component array 230, processes the information, and transmits the information to the control system 210. The control system 210 generates a farming action based on the information and transmits instructions to implement the farming action to the appropriate component(s) 232 of the component array 230.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

III. Real-Time Performance Estimation

Figure 3:
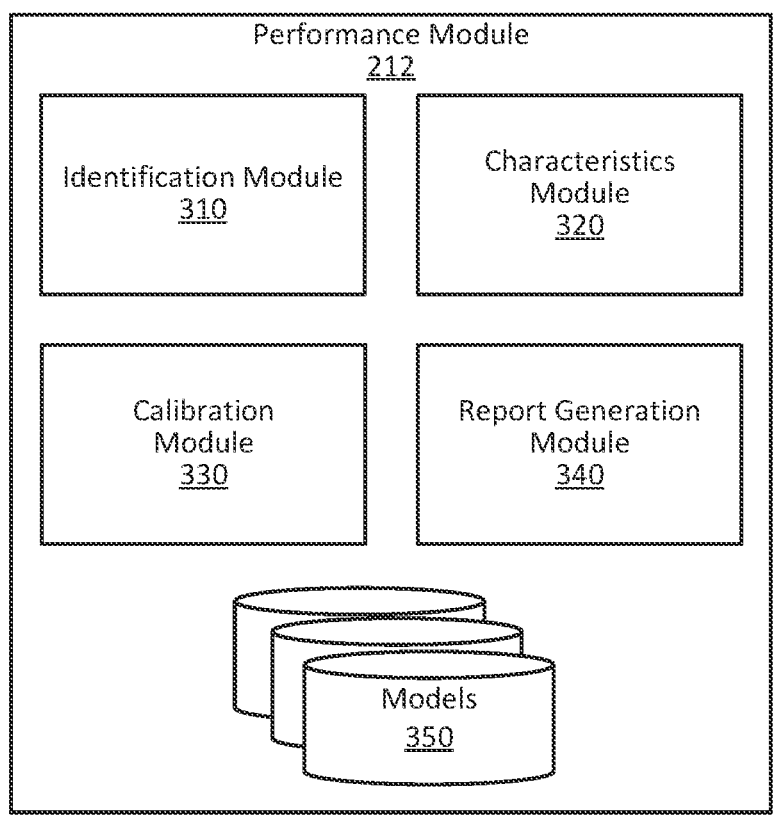
FIG. 3 illustrates an example of the performance estimation module, according to one example embodiment.

As described above, the control system 210 includes a performance estimation module 212. The performance estimation module 212 is configured to adjust the performance characteristics of a farming machine 100 as the farming machine 100 travels through the field. FIG. 3 illustrates an example of the performance estimation module, according to one example embodiment. The performance estimation module 212 includes a plant identification module 310, a characteristics module 320, a adjustment module 330, a report generation module 340, and models 350. The performance estimation module 212 may include additional or fewer modules, and the functionality of a module may be attributable to a different module. Moreover, the various functionalities of the performance estimation module 212 may be attributable to different components and systems within the environment 200.

III.A Plant Identification

The performance estimation module 212 includes a plant identification module 310. The control system 130 employs the plant identification module 310 to identify plants in images captured by a detection mechanism 110. The plant identification module 310 identifies plant by applying one or more of the models 350 trained to identify plant to the images. The farming machine 100 treats plants identified in images using a treatment mechanism 120.

The plant identification module 310 may apply different types of models 350 to images to identify plants, some of which are described hereinbelow.

Segmentation Models

In a first example, the plant identification module 310 applies a semantic segmentation model to an image to identify plants in the image. The segmentation model may be a convolutional neural network including an input layer, a latent layer, an output layer, and intermediate layers that, in aggregate, are trained to identify plants in images.

To identify plants in an image using the segmentation model, the plant identification module 310 encodes an image onto an input layer of the convolutional neural network and applies various functions, weights, and parameters using intermediate layers to reduce the dimensionality of the image on the input layer to that of the latent layer. Within the latent layer, the convolutional neural network is trained to recognize latent information in the encoded information representing plants. The plant identification module 310 decodes information from the latent layer to the output layer. Decoding the information may include applying various functions, weights, and parameters using intermediate layers. At the output layer, each pixel of the input image is labelled as representing plant. Pixels may be upsampled or downsampled throughout the model process depending on the configuration of the segmentation model.

In some configurations, each pixel corresponds to a probability that the pixel represents a plant (e.g., one pixel has a 65% chance of representing a plant, while another pixel has a 92% chance of representing a plant). The plant identification module 310 may then identify plants in the image based on the labels and/or their corresponding probabilities. For example, the plant identification module 310 identifies a plant as a group of pixels labelled as a plant and having a high probability the pixels represent a plant. The farming machine 100 treats plants identified in the image. For example, the farming machine treats the plant by applying a treatment with a treatment mechanism 120 at the location in the field corresponding to pixels identified as the plant in the image.

An example segmentation model is described in U.S. Pat. No. 11,514,671, titled "Segmentation for Plant Treatment and Treatment Verification," filed Jun. 4, 2020, which is hereby incorporated by reference in its entirety.

Bounding Box Models

In a second example, the plant identification module 310 applies a bounding box model to an image to identify plants. The bounding box model is trained to identify two-dimensional regions in an image that contain pixels representing a plant (rather than labelling individual pixels as representing plants). In some configurations, the bounding box model places a box around the two-dimensional regions, and/or generates a probability that the boxed pixels represent a plant. The plant identification module 310 identifies plants in the image using the boxed pixels and their associated probabilities (e.g., pixels in this box have a 48% chance of representing a plant, while pixels in this box have an 81% chance of representing a plant). The farming machine 100 treats plants in the field based on plants identified in bounding boxes.

An example bounding box model is described in U.S. Pat. No. 11,093,745, titled "Automated plant detection using image data," filed May 9, 2018, which is hereby incorporated by reference in its entirety.

Variable Sensitivity Models

Different models 350 employed by the plant identification module 310 may also be configured to identify plants using variable plant identification sensitivities. A plant identification sensitivity is a parameter of a model 350 quantifying how "sensitive" the model 350 is when identifying plants, with high-sensitivity models identifying more visual information in an image (e.g., pixels) as a plant and low-sensitivity models identifying less visual information in an image as plants. Any number of sensitivity levels are possible (e.g., 1, 2, 3, 5, 10, etc.).

To illustrate, consider a model 350 configured to identify plants with either a high plant identification sensitivity or a low plant identification sensitivity when applied to an image. The farming machine 100 captures an image of a plant in the field. The image includes green pixels representing the plant, brown pixels representing the substrate, and green-brown pixels that may represent either the plant or the substrate. For both high and low sensitivity, the plant identification module 310 identifies green pixels as representing plants and brown pixels as representing substrate. However, the plant identification module 310 identifies the green-brown pixels as a plant when using the high plant identification sensitivity (because the pixel might represent plant) and identifies the green-brown pixels as substrate when using the low plant identification sensitivity (because the pixel might represent the substrate).

In some configurations, each plant identification sensitivity may correspond to a probability that a pixel (or group of pixels) represents a plant. For instance, the plant identification module 310 may employ a model 350 trained to output a probability value between 0.0 and 1.0 that each pixel (or group of pixels) represents a plant, where 0.0 represents an improbable plant and 1.0 represents a probable plant. Within this framework, a high plant identification sensitivity may identify any pixel having a probability above, e.g., 0.65 as a plant, while a low plant identification sensitivity may identify any pixel having a probability above, e.g., 0.80 as a plant. Because the probability threshold for the high plant identification sensitivity is lower than the threshold for the low plant identification sensitivity, the plant identification module 310 will identify more pixels representing plants using the high plant identification sensitivity compared to using the low plant identification sensitivity.

In some configurations, each plant identification sensitivity level may correspond to particular performance characteristics. That is, a model 350 employing a first plant identification sensitivity may have a first set of performance characteristics, a second plant identification sensitivity may have a second set of performance characteristics, etc. Because of this, a farming machine 100 may be able to determine a plant identification sensitivity to achieve a target performance characteristic. For instance, consider a farming machine 100 employing a model 350 to identify plants at a first plant sensitivity. The farming machine 100 achieves the first set of performance characteristics. The farming machine 100 then receives a target performance characteristic that is the same as (or similar to, e.g., within 2%, 5%, 10% etc.) a performance characteristic having a corresponding plant identification sensitivity. In turn, the farming machine 100 may automatically implement the plant identification sensitivity to achieve the target performance characteristic or recommend that a manager implement the corresponding plant identification sensitivity.

Multi-Class Models

Models 350 applied by the plant identification module 310 may also be a multi-classifier model capable of identifying various classes of objects in an image. For instance, plant identification module 310 may be configured to identify substrate, obstructions, humans, components, plants, or other objects in the image. Moreover, the models 350 may be capable of distinguishing between the types of objects. For instance, the plant identification module 310 may employ a model 350 capable of identifying plants as weeds or crops, and further capable of determining the species of each distinct weed and/or crop.

A multi-classifier model trained to identify different types and species of plants is described in described in U.S. patent application Ser. No. 16/995,618, titled "Plant Group Identification," filed on Aug. 17, 2020. The model described therein may be configured with additional labels.

Model Configuration

Figure 4A:
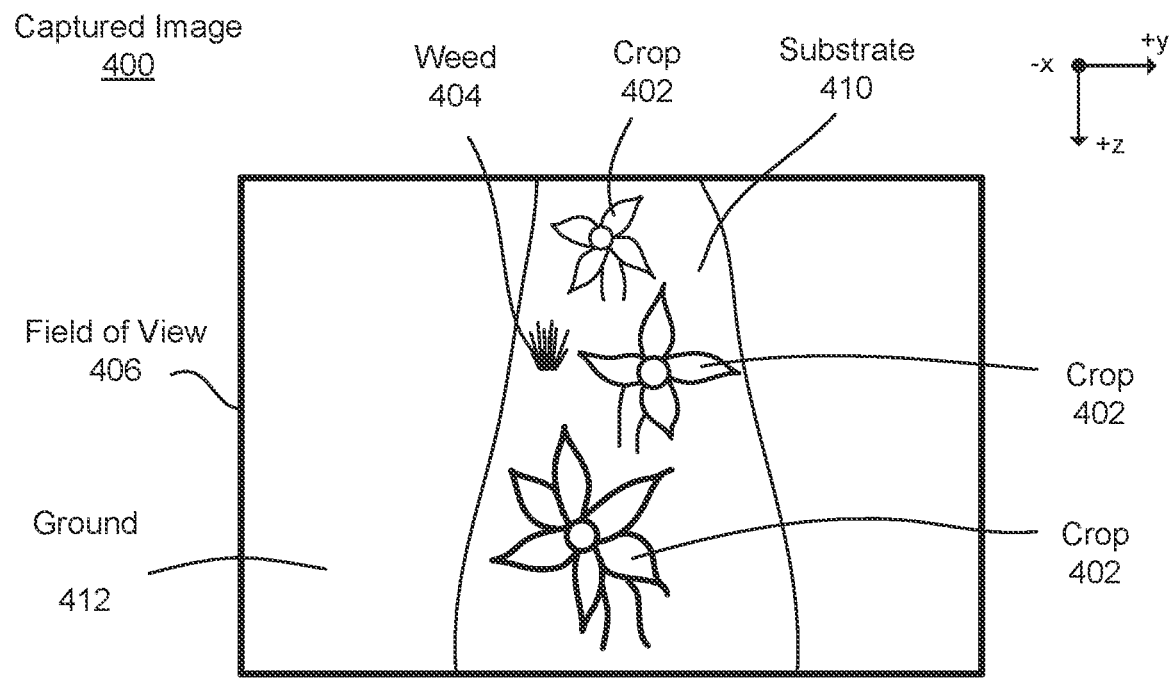
FIG. 4A illustrates an accessed image of the field captured by the farming machine 100, according to one example embodiment.
Figure 4B:
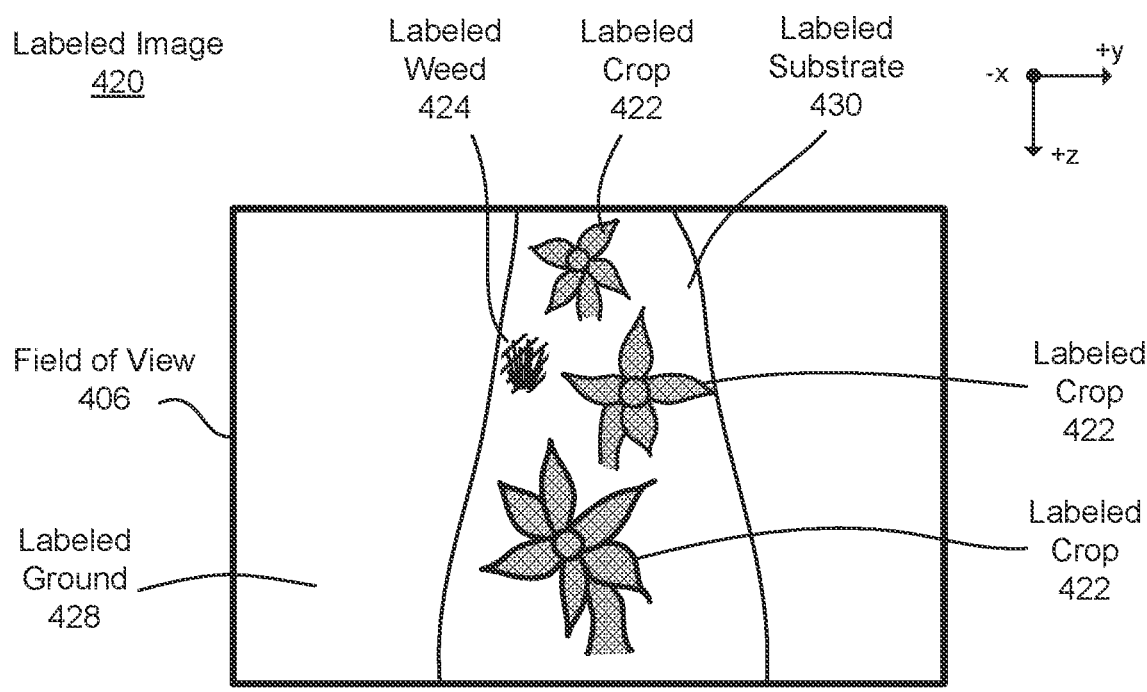
FIG. 4B illustrates a labeled image of the field, according to one example embodiment.

Whatever the case, the control system 210 employs a plant identification module 310 to apply one or more models 350 to an image captured by the farming machine 100 as it travels through the field to treat plants. FIGS. 4A and 4B illustrate an example embodiment of this process. Importantly, features of the various models 350 described herein can be combined to generate a model 350 appropriate for the farming objective and farming actions of the farming machine 100. For instance, the farming machine 100 may employ a multi-class classifier trained to identify different types and species of plants in an image, and the classifier may be configured to identify plants in images at a variety of plant identification sensitivities. Moreover, this model may be configured to identify crops with a first plant identification sensitivity and weeds with a second, different plant identification sensitivity.

Example Image Labelling

FIG. 4A illustrates an accessed image of the field captured by the farming machine, according to one example embodiment. The accessed image 400 of the field (e.g., field 160) includes various plants and the ground within the field of view 406. The plants include multiple crops 402 and a weed 404 growing on a substrate 410. In some examples (not pictured), the image 400 also includes visual information representing one or more machine components, the sky, persons, obstacles, animals, or any other objects pertinent to the environment.

FIG. 4B illustrates a labeled image of the field, according to one example embodiment. To generate the labeled image 420, the farming machine 100 employs the plant identification module 310 to apply one or more models 350 to the accessed image. The plant identification module 310 processes the visual information (e.g., one or more pixels in the accessed image 400) to determine the real-world object(s) that visual information represents. For example, the labeled image 420 includes labeled crops 422, a labeled weed 424, the labeled ground 428, and the labeled substrate 430, each of which corresponds to pixels whose visual information represents the crops 402, the weed 404, the ground 412, and the substrate 410, respectively. Pixels in the labeled image 420 labeled as the weed 424 have a first fill pattern, and pixels in the labeled image 420 labeled as a crop 422 has a second fill pattern. For clarity, pixels in the labeled image 420 labeled as substrate 430 and ground remain unfilled 528.

Additionally, the labeled visual information is overlaid on the captured image, though it need not be.

III.B Calculating Performance Characteristics

The performance estimation module 212 includes a characteristics module 320. The control system 130 employs the performance estimation module 212 to calculate performance characteristics of the farming machine 100 using the characteristics module 320 as the farming machine 100 travels through the field capturing images and treating plants. The characteristics module 320 may employ any number of models 350 to calculate performance characteristics.

Performance characteristics are a qualitative or quantitative measure of farming actions (e.g., treatments such as a spray treatment) or farming objectives (e.g., weeding a field). Performance characteristics may measure, for example, accuracy, chemical usage, economic value, or some other suitable metric for calibrating farming actions and/or farming objectives. Additionally, performance characteristics may be calculated as expected performance characteristics or realized performance characteristics depending on the configuration of the characteristics module 320.

The characteristics module 320 also notifies a manager of determined performance characteristics and may do so in several different ways. For example, the characteristics module 320 may display calculated performance characteristics on a display of the farming machine (e.g., on a user interface in a cab of the farming machine 100) such that the performance characteristics are visible to a manager in the cab of the farming machine. In another example, the characteristics module 320 can transmit performance characteristics to a remote client device over the network 240 such that the performance characteristics are viewable by a manager operating the remote client device. In some cases, the characteristics module 320 may transmit the notification to a manager if the characteristics module 320 determines the performance characteristics are at least a threshold level away from the target performance characteristics. These methods are not intended to be limiting and there are many other ways of informing a manager of calculated performance characteristics.

Accuracy

The characteristics module 320 can calculate accuracy when calculating performance characteristics. Accuracy describes, for example, how accurate or precise a farming machine 100 is when performing a farming action or working towards a farming objective. Accuracy may be described either quantitatively or qualitatively. As a simple example, consider a farming machine 100 configured such that a detection mechanism 110 captures images of weeds, a plant identification module 310 identifies weeds in those images, and a treatment mechanism 120 treats weeds identified in those images. In this example, accuracy may quantify whether the plant identification module 310 accurately identifies weeds in an image and/or whether the farming machine 100 accurately treats the weeds. For instance, the accuracy may quantify that the farming machine 100 treated identified weeds (e.g., using a qualitative "treated" or "non-treated"), or may quantify that the plant identification module 310 accurately identified weeds in the image (e.g., identified weeds with 92% accuracy).

The characteristics module 320 can quantify accuracy in a variety of manners. In a first example, the characteristics module 320 may calculate accuracy as a plant hit rate. The plant hit rate quantifies how accurately the farming machine 100 identifies and treats plants (e.g., weed hit rate, crop hit rate, etc.). In a second example, the characteristics module may calculate accuracy as a weed miss rate. The weed miss rate quantifies how often the plant identification module 310 did not accurately identify a plant in an image (such that it went untreated), and/or how often the farming machine 100 did not treat an accurately identified plant (e.g., by incorrectly placing a treatment).

Other examples of quantifying accuracy are also possible. For instance, the characteristics module 320 may describe whether (1) a plant identified as a crop was actually a weed (or vice versa), (2) a plant targeted for a first treatment received a second treatment, (3) a farming machine 100 performs an intended farming action, (4) a farming machine 100 completes a farming objective, etc. Other accuracy examples may include quantifying true positives and false negatives within field regions.

Treatment Usage

The characteristics module 320 can calculate chemical usage when calculating performance characteristics. Chemical usage describes, for example, how much of a treatment is used (e.g., a treatment fluid, a treatment chemical, etc.) when performing a farming action or working towards a farming objective. Treatment usage may be described either quantitatively or qualitatively, and/or may be described in absolute or relative terms. As a simple example, consider again the farming machine 100 configured to capture images of weeds, identify weeds in those images, and treat identified weeds in those images. In this example, chemical usage may quantify how much herbicide a treatment mechanism 120 applies to a weed identified in the image. For instance, chemical usage may quantify that the farming machine 100 applied a particular dose to an identified weed, or may quantify a relative overspray of the identified weed.

The characteristics module 320 can quantify chemical usage in a variety of manners. In a first example, the characteristics module 320 may calculate chemical usage as a plant overspray or underspray. Overspray quantifies how much "extra" treatment the farming machine 100 applied to an identified plant. Underspray quantifies how much "missing" treatment was not applied to an identified plant. Overspray and underspray may be calculated using expected, realized, or target dosages and/or be calculated based on treatment area, field region, field region size, etc. In a second example, the characteristics module 320 may calculate treatment usage as a treatment dose. A treatment dose quantifies a volume, a volume per area, a volume per plant, etc. the farming machine 100 applies to an identified plant. Still further, the characteristics module may quantify treatment usage as a combination between weed hit rate and cost savings (e.g., reduced operation cost, material cost, etc.), where the higher weed hit rates generally indicate lower savings and vice versa. Similarly, the characteristics module may quantify the mortality rate of the plants in the field. To do so, the farming machine or an operator may by visit the field a period of time after application and count how many plants have died versus how many were sprayed. Other examples of quantifying accuracy are also possible, and these examples are not intended to be limiting.

Economic Value

The characteristics module 320 can calculate economic value when calculating performance characteristics. Economic value is, for example, a quantization of the economic effects of performing farming actions or accomplishing a farming objective for a manager. Economic value may be described either quantitatively or qualitatively, and may be described either absolutely or relatively. As a simple example, consider again the farming machine 100 configured to capture images of weeds, identify weeds in those images, and treat identified weeds in those images. In this example, economic value may reflect an absolute cost of moving from one plant identification sensitivity to another plant identification sensitivity for whatever model 350 is used to identify plants. For instance, the economic value may reflect that the modifying the model 350 to use a higher plant identification sensitivity will cost $650 more per acre.

The characteristics module 320 can quantify economic value in a variety of manners. In a first example, the characteristics module 320 may calculate economic value as an absolute cost. Absolute cost quantifies how much implementing a farming action, modifying a model, etc. will cost when implemented. Absolute costs may be calculated per area, per plant, per treatment, per farming action, per unit time, etc. In a second example, the characteristics module 320 may calculate economic value as a relative cost. Relative cost quantifies how much implementing a farming action, modifying a model, etc. will cost a manager relative to another farming action, model implementation, etc. Typically, the relative cost quantifies a future economic value relative to a current economic value. For instance, the relative cost may quantify that a new farming action would cost less than a current farming action. Relative costs may also be may also be calculated per area, per plant, per treatment, per farming action, per unit time, etc. Other examples of quantifying economic value are also possible, and these examples are not intended to be limiting.

Realized Performance Characteristics

The characteristics module 320 can calculate realized performance characteristics. Realized performance characteristics quantify performance characteristics of a farming machine 100 calculated using measured data from the field. The measured data may be measured using, e.g., sensors 222 of external systems 220, sensors 236 of the machine component array 230, and/or verification mechanism 150. As a simple example, consider again the farming machine 100 configured to capture images of weeds, identify weeds in those images, treat identified weeds in those images. This farming machine 100 is further configured to verify treatments using verification mechanism 150. In this example, the characteristics module 320 may calculate performance characteristics using data measured by the verification mechanism 150. For instance, the characteristics module 320 may calculate accuracy using data measured from verification mechanism 150.

Additionally, the characteristics module 320 can calculate realized performance characteristics using data describing previously executed farming actions. Previously executed farming actions may occur on a previous pass, in a previous season, in another field, etc. As an example, the characteristics module 320 may access data describing an executed farming action from a previous farming pass (e.g., various parameters used when spraying an identified weed). The characteristics module 320 generates realized performance metrics by comparing currently measured data to the data describing previously executed farming action.

The characteristics module 320 can use any other data within the system environment 200 to generate realized performance characteristics as necessary. Whatever the case, the performance estimation module 212 provides realized performance characteristics based on data measured as the farming machine 100 (or an external system 220) travels through the field.

Expected Performance Characteristics

The characteristics module 320 can calculate expected performance characteristics. Expected performance characteristics quantify predicted performance characteristics of the farming machine 100. The characteristics module 320 may calculate expected performance characteristics using predictive models 350 trained to calculate performance characteristics based on image data and model 350 parameters.

As a simple example, consider a farming machine 100 configured to capture images of weeds, identify weeds in those images, and treat identified weeds in those images. In this example, the characteristics module 320 calculates expected performance characteristics by applying one or more models 350 to the captured images as it travels through the field. For instance, the characteristics module 320 may apply one or more models 350 to an image to predict, e.g., accuracy of the farming machine 100 spraying identified weeds (even though it has yet to do so).

Calculating expected performance characteristics is a more complex problem than calculating realized performance characteristics because the characteristics module 320 is unable to leverage measured data. Instead, the characteristics module 320 employs various models 350 trained to generate expected performance characteristics using different methods.

In an example configuration, the characteristics module 320 employs a semantic segmentation model to calculate expected performance characteristics. In this example, the characteristics module 320 inputs an image to the semantic segmentation model, the control system 210 processes the image with the model, and the model outputs softmax values and a feature embedding layer. The softmax values are used to identify weeds and weed locations. The feature embedding layer is used to generate expected performance characteristics. The characteristics module 320 calculates expected performance characteristics by calculating a feature density map on a per pixel basis from the feature embedding layer. The characteristics module 320 correlates the feature density map with model confidence (e.g., an identified plant label and its corresponding probability) and with segmentation model performance. The characteristics module 320 calculates a correlation factor representing the expected performance characteristics.

To illustrate, consider a farming machine 100 employing a semantic segmentation model configured to generate expected performance characteristics for farming machine accuracy, e.g., weed hit rate ("expected weed hit rate"). In this example, the characteristics module 320 calculates the expected weed hit rate on a per-image basis. To do so, the characteristics module 320 calculates a feature density map on a per pixel basis and aggregates the feature density map into a single quantification of accuracy for the image. For instance, the characteristics module 320 may calculate the percentage of low confidence pixels (i.e., with a feature density value below a threshold value) in an image. In some cases, the characteristics module 320 may calculate the expected weed hit rate using the percentage of low confidence pixels in tandem with histogram binning on validation data. Additionally, the characteristics module 320 may use various other functions to more accurately quantify the expected weed hit rate. For example, the characteristics module 320 may smooth the expected weed hit rate an exponential moving average or some other example function. Of course, the example provided here for an expected accuracy performance characteristic may be used for other performance characteristics.

In some configurations, the characteristics module 320 calculates expected performance characteristics by aggregating a temporal sliding window of images. For example, calculating an expected weed hit rate using the last 20 images for each of 8 detection mechanism 110 coupled to a mounting mechanism 140 of the farming machine 100. The characteristics module 320 calculates a feature density map for each of these images, and projects the feature density map to a ground plane. The characteristics module 320 calculates a feature value for each location in the ground plane by taking the maximum value of overlapping projected feature density maps. The characteristics module 320 generates an aggregated feature density map using overlapping features and feature density maps. In turn, characteristics module 320 calculates a single quantification of accuracy using the aggregate feature density map, e.g., by calculating the percentage of low confidence pixels. In some cases, the characteristics module 320 may calculate the expected weed hit rate using the percentage of low confidence pixels in tandem with histogram binning on validation data. Additionally, the characteristics module 320 may use various other functions to more accurately quantify the expected weed hit rate. For example, the characteristics module 320 may smooth the expected weed hit rate an exponential moving average or some other example function. Of course, the example provided here for an expected accuracy performance characteristic may be used for other performance characteristics.

The principles described above in generating expected performance characteristics using feature density maps in single images, or an aggregation of images, can be expanded to other situations. For instance, in some examples, the characteristics module 320 generates expected performance characteristics by aggregating all images corresponding to a field portion, field, or multiple fields. The field portion may be a ground plane of a predefined size, such as, e.g., 100 meters in the direction of travel and 20 meters perpendicular to the direction of travel.

Example Algorithms for Measuring Model Performance

As described above, the characteristics module 320 calculates expected performance characteristics. In doing characteristics module 320 can calculate a measure of performance for the model such that model and performance characteristics may be calibrated and/or adjusted in real time.

In an example, the characteristics module 320 determines a measure of model performance by (1) inputting an image captured from a field into a model (e.g., a neural network) executing a single forward pass, and generating an softmax output, (2) selecting a target class for which uncertainty will be computed, (3) generating a pair of predictions, (4) selecting a metric, (5) computing the selected metric pairwise on the pair of predictions corresponding to the same input image, and (6) generating a measure of model performance from the calculated metric.

At step (1), the model may be a variety of models, some of which are described hereinabove. For instance the model may be a semantic segmentation model with a binary output, or may be an object detection model. The input may be a form of data other than an image, such as, for example, a measurement from the field, historic data etc. Similarly, the model output need not be softmax, but could be other outputs. The model may be applied to the final logits of a model, rather than initial data inputs.

At step (2), in some examples, uncertainty can be calculated for some or all classes present in the model (e.g., plants, substrate, obstruction, etc.). In some cases, uncertainty can be calculated for all classes, by repeating steps 3-5 iteratively, and the threshold for determining uncertainty may be different for each class. In other cases, uncertainty is calculated for all classes simultaneously using a pair of predictions that maintain the N classes of the input (non-binary predictions).

At step (3), the model may use different techniques when generating a pair of predictions. For example, the model may generate a pair of binary predictions for the target class by (a) selecting a lower threshold and an upper threshold, (b) generating a prediction corresponding to the lower threshold where the softmax output for target class is greater than the lower threshold, and/or (c) generating a prediction corresponding to the upper threshold where the softmax output for target class is greater than the upper threshold.

Another example method of generating the pair of predictions includes maintaining the N classes of the input includes: (a) Selecting a smaller and larger value (eg. −0.1 and 0.1), (b) generating a prediction corresponding to the smaller value, adding the smaller value to the target class of the softmax output, and generating a prediction by computing the argmax of the resulting sum, (b) generating a prediction corresponding to the the larger value, adding the larger value to the target class of the softmax output, and (c) generating a prediction by computing the argmax of the resulting sum.

Another example method of generating the pair of predictions that maintain the N classes of input and applies the threshold to all classes simultaneously includes: (a) Selecting a lower and higher threshold between 0 and 1 inclusive (eg. 0 and 0.5), (b) generating a prediction corresponding to the lower threshold, calculating argmax (softmax output), generating a prediction by masking out regions where max (softmax output) across the N classes is less than the lower threshold, and (c) generating a prediction corresponding to the upper threshold, calculating argmax (softmax output), and generating a prediction by masking out regions where max (softmax output) across the N classes less than the upper threshold.

In some examples, the characteristics module 320 may compute upper and lower thresholds used for generating the binary predictions using a search (eg. a grid search) of threshold pairs on a validation set. The model may then select the upper and lower thresholds that lead to uncertainty estimations correlated with the target metric, or that most predict the target metric.

At step (4) the selected metric may be an image-level metric, e.g., an intersection over union (rather than a pixel level metric). In some examples, the selected metric is an instance metric, such as instance F1 score.

At step (5), predictions are projected and aggregated before computing the metric. For example, for a sliding window of 20 images, a set of predictions corresponding to the lower threshold are generated, and all projected to the ground plane. Target class positives for this set are aggregated, for example by taking the union across all 20 images. Similarly, a set of target class predictions corresponding to the higher threshold are calculated. The metric is then calculated between these two sets of target class positives that have been projected to the ground plane.

In some examples, the characteristics module 320 may employ postprocessing when determining a measure of performance of a model. For instance, in an example, the characteristics module 320 determines a secondary metric based on an aggregation of data. The aggregation may be calculated in real time based on a sliding window of data, and the result of the aggregation may be displayed as feedback to an operator. In some examples, only when the result crosses a predetermined threshold is the operator notified. In order to avoid inaccurate results due to data paucity after startup, in some embodiments, the operator will only receive the result or an alert after a certain length of time has elapsed after startup or after a certain number of images have been aggregated.

To illustrate, in an example, for a group of 20 images, the characteristics module 320 may calculate a set of primary metrics for each image, e.g., instances of true positives, false negatives, false positives, and true negatives. The characteristics module 320 may then aggregate these primary metrics for the group of 20 images, in order to calculate the secondary metric, e.g., an F1 score across all 20 images.

To illustrate, in an example, the characteristics module may aggregate a group of 20 images through a sequence model like a Markov Chain. In this case, the predictions may come one at a time and each prediction is highly correlated to the previous prediction since images are overlapping. Employing this approach may smooth out spurious bad predictions due to the model or the confidence consistency scoring system.

To illustrate, in an example, for a single image, the characteristics module 320 may repeat steps (2) through (5) with different lower and upper thresholds. In this way, the characteristics module 320 calculates a set of primary metrics for each pair of predictions such as, e.g., instances of true positives, false negatives, false positives, and true negatives. The characteristics module 320 may then aggregate these primary metrics for the group of all pairwise predictions, in order to calculate the secondary metric of instance F1 score for the image.

Finally, in some examples, the characteristics module may apply the process above in a manner that accounts for geospatial overlap. In this case, the input is two images that have at least some portion of an overlapping field of view. In this case, instead of outputting model uncertainty from ensembled predictions from different models or ensembled predictions from a single model with various threshold, the geospatial method ensembles predictions from a single model with various viewpoints and estimates the multi-view consistency for model uncertainty.

Challenges in Generating Performance Characteristics

Generating performance characteristics (either expected or realized) is challenging due to the storage space and processing power necessary for performing the appropriate calculations in real-time. For example, it may not be possible for a farming machine 100 to store every image of a field, or it may not be possible for the farming machine to process each and every captured image to calculate the desired performance characteristics. The farming machine 100 may address these challenges in a variety of ways.

In a first example, the characteristics module 320 may process each image into a feature density map in real-time, then store a feature density map that is downsampled compared to the initial image (e.g., by using average pooling or max pooling). The characteristics module 320 can then use the downsampled feature density maps to calculate performance characteristics for larger amounts of field relative to non-downsampled feature density maps.

In a second example, the characteristics module 320 calculates performance characteristics for field regions rather than the entire field. The characteristics module 320 stores the predicted weed hit rate for each subregion and deletes the processed image and feature density maps. The characteristics module 320 may calculate the performance characteristics for the entire field using the various field regions.

In a third example, only a subsample of images captured of the field are processed by the characteristics module 320 to generate performance characteristics.

III.C Performance Adjustments

The performance estimation module 212 includes a adjustment module 330. The control system 130 employs the adjustment module 212 to adjust performance characteristics of the farming machine 100 according to a farming objective implemented by a manager. In one configuration, the farming objective is a farming machine 100 achieving target performance characteristics. Target performance characteristics are performance characteristics a manager wishes the farming machine 100 to attain while performing farming actions in the field. To achieve the target performance characteristics, the adjustment module may adjust performance characteristics of the farming machine 100 by utilizing different models 350, modifying models 350, modifying farming actions (e.g., modifying parameters or a spray treatment), etc.

To provide a contextual example, consider a farming machine 100 that travels through the field capturing images of plants, identifying plants in those images, treating the identified plants, and calculating performance characteristics of the farming machine 100 as it treats the plants. For instance, the farming machine 100 may employ the characteristics module 320 to calculate an expected (or realized) weed hit rate for the farming machine 100. In this example, the farming machine 100 determines the expected weed hit rate of the farming machine 100 is less than its target weed hit rate. In response, the adjustment module 330 modifies one or more models 350 used to identify plants, which correspondingly modifies how many plants are identified and treated, such that the expected weed hit rate is at least the target weed hit rate.

The adjustment module 330 receives target performance characteristics and calibrates performance characteristics to achieve the target performance characteristics in a variety of ways, some of which are described in more detail below.

Target Performance Characteristics

The adjustment module 330 can implement the target performance characteristics of a farming machine 100 in a variety of ways.

In a first example, the adjustment module 330 receives the target performance characteristics from a manager. For instance, the farming machine 100 may receive the target performance characteristics as an input from an interface of the farming machine 100, or may receive the target performance characteristics from a remote client device operated by the manager via the network 240. Once the adjustment module 330 receives the target performance characteristics, the adjustment module 330 calibrates the performance characteristics of the farming machine 100 to match the target performance characteristics.

In a second example, the adjustment module 330 accesses the target performance characteristics. The adjustment module 330 may access the target performance characteristics from a database local to the farming machine 100, or on a database remote from the farming machine 100. The target performance characteristics stored in the database may be generated by a manager before the farming machine 100 enters the field, before a season, when generating a treatment plan, etc. In some cases, specific farming actions may be associated with specific target performance characteristics, and the farming machine 100 may access the appropriate target performance characteristic when it performs a farming action. Once the adjustment module 330 access the target performance characteristics, the adjustment module 330 can adjust the performance characteristics of the farming machine 100 to match (or attempt to match) the target performance characteristics.

In a third example, the adjustment module 330 determines (e.g., autonomously) the target performance characteristics. For instance, the adjustment module 330 may implement a model that determines or accesses characteristics of the environment, field, previous passes, or farming history, etc. to determine target performance characteristics. The adjustment module 330 may then adjust the performance characteristics of the farming machine to match the target performance characteristics.

Adjusting Performance Characteristics

The adjustment module 330 adjust the performance characteristics of a farming machine 100 to match target performance characteristics in several ways. Notably, while the farming machine 100 may calibrate the farming machine to match target performance characteristics, the farming machine 100 may never achieve an exact match. That is, the farming machine 100 calibrates performance characteristics in a manner that attempts to match the target performance characteristics, even though it may not actually match the target. For instance, the farming machine 100 may adjust performance characteristics by increasing a selectivity of a plant identification model in order to achieve a target weed hit rate. However, even after increasing the selectivity, the farming machine 100 may not achieve the target hit rate, but the adjustment may improve the hit rate relative to when it was uncalibrated.

In a first example, the adjustment module 330 may modify a farming action to achieve, or attempt to achieve, the target performance characteristics. That is, the adjustment module 330 may modify a farming action in a manner expected to achieve the target performance characteristics. The adjustment module 330 may determine that the realized (or expected) performance characteristics indicate that an implemented (or intended) farming action did not (or will not) achieve the target performance characteristics and, in response, the adjustment module 330 modifies a future (or current) farming action such that it will achieve the target performance characteristics.

For instance, a farming machine 100 is configured to perform farming actions for identifying and treating weeds in a field. To do so, the farming machine 100 provides a first dose to identified weeds with a treatment mechanism 120. The characteristics module 320 calculates that the expected performance characteristics of the farming machine 100 implementing the first dose is less than the target performance characteristics of the farming machine 100. In turn, the adjustment module 330 determines that a second dose different from the first dose to treat the identified weeds, and the characteristics module 320 determines the expected performance characteristics of the farming machine 100 implementing the second dose meets the target performance characteristics. Accordingly, the adjustment module 330 generates instructions for the farming machine 100 to modify the farming action to implement the second dose rather than the first dose.

In a second example, the adjustment module 330 may modify a model 350 to achieve, or attempt to achieve, the target performance characteristics. To expand, a plant identification module 310 may employ a model 350 having several plant identification sensitivities to identify plants for treatment as described above. The characteristics module 320 calculates the performance characteristics when using a particular plant identification sensitivity, and the adjustment module 330 calibrates the performance characteristics to the target performance characteristics by modifying the model to employ a different plant identification sensitivity that achieves the target performance characteristics. That is, the adjustment module 330 may modify the model and/or sensitivities in a manner expected to achieve the target performance characteristics.

For example, a farming machine 100 is configured to perform farming actions for identifying and treating weeds in a field. To do so, the farming machine 100 identifies and treats plants with a model 350 employing a first plant identification sensitivity of several plant identification sensitivities. The characteristics module 320 calculates the expected performance characteristics when using the first plant identification sensitivity. The adjustment module 330 receives or accesses target performance characteristics and modifies the model 350 to employ a second plant identification sensitivity of the several plant identification sensitivities. In doing so, the number of weeds identified and treated by the farming machine 100 will change and the characteristics module 320 determines the expected performance characteristics meets the target performance characteristics.

III.D Example Implementation

Figure 5:
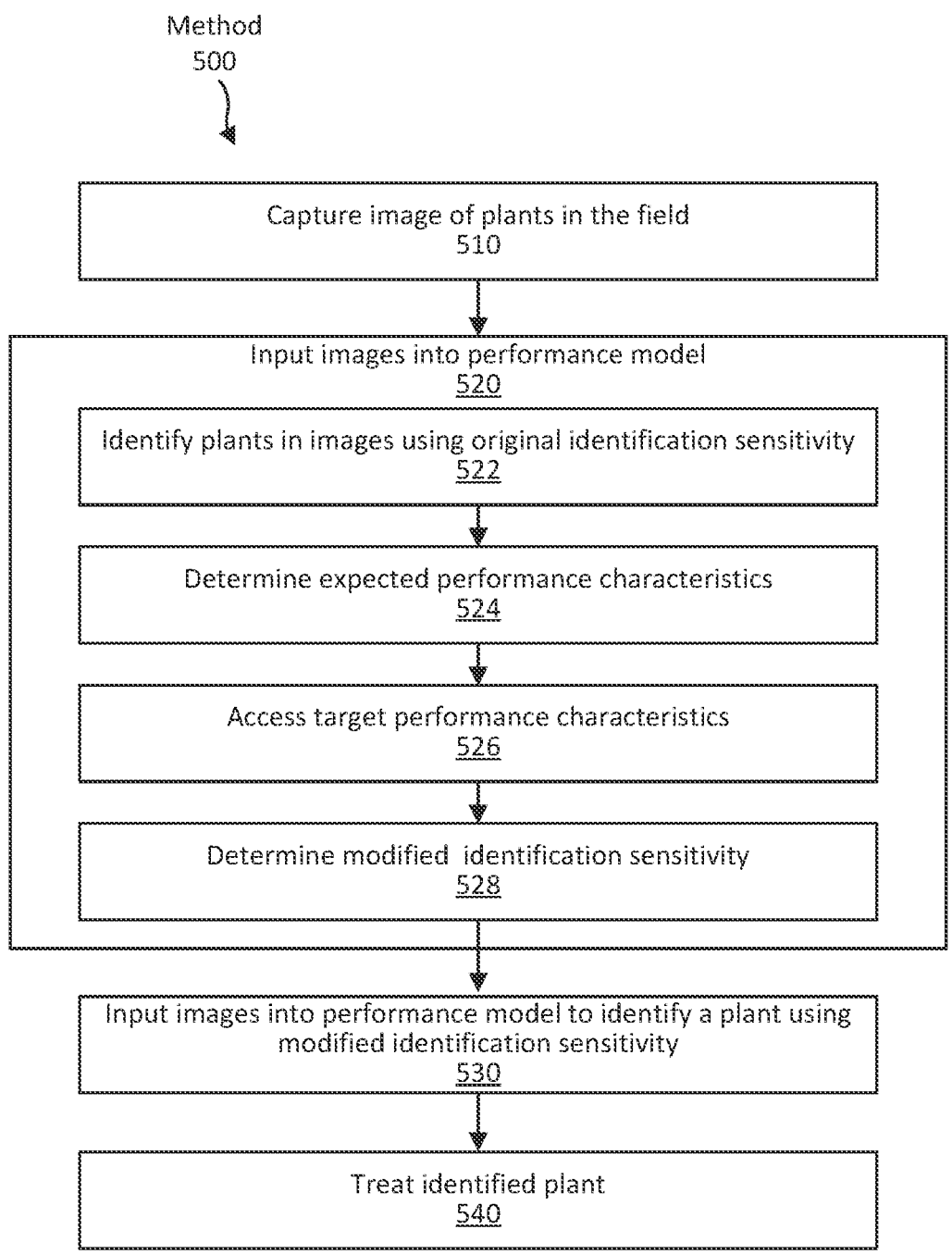
FIG. 5 illustrates an example method for calibrating performance characteristics of a farming machine, according to one example embodiment.

FIG. 5 illustrates an example method for calibrating performance characteristics of a farming machine, according to one example embodiment. The workflow 500 of the method is just an example. In various configurations, the workflow may include additional or fewer steps, or the steps may occur in a different order.

The farming machine (e.g., farming machine 100) captures 510 images of plants (e.g., plant 104) in a field (e.g., field 160) using a detection mechanism (e.g., detection mechanism 110) as it travels through the field treating plants with treatment mechanisms (e.g., treatment mechanism 120).

A control system (e.g., control system 130) of the farming machine inputs 520 captured images into a performance model (e.g., model 440). The performance model is trained to identify plants in images and calculate performance characteristics of the farming machine.

The control system processes the images using the performance model to identify 522 plants in the images. The performance model employs an original plant identification sensitivity to identify the plants.

The control system processes the images using the performance model to determine 524 expected performance characteristics of the farming machine when treating plants identified in the images using the original identification sensitivity.

The control system accesses 526 a target performance characteristic for the farming machine. For example, the control system may access the target performance characteristic over the network from a manager or may access the target performance characteristic from an input from a display in the farming machine. In an example, the target performance characteristic may be "greater weed hit rate."

The control system, using the performance model, determines 528 a modified identification sensitivity for the performance model that achieves, or is expected to achieve, the target performance characteristic for the farming machine. For example, if the accessed target performance characteristic is "greater weed hit rate," the performance model may determine a modified identification sensitivity that is more sensitive than the original identification sensitivity such that the farming machine implements treatments that are expected to achieve the greater hit rate.

The farming machine captures additional images of plants as it continues to travel through the field capturing images. The control system inputs 530 the additional captured images into the performance model to identify a plant in the additional images. The performance model employs the modified plant identification sensitivity to identify the plant in an image.

The farming machine treats 540 the identified plant using a treatment mechanism of the farming machine.

IV. Generating Performance Estimation Reports

As described above, there are many difficulties in determining and calibrating performance characteristics in real-time due to the nature of the system environment 200. For example, capturing an image, processing that image to identify plants, calculating performance characteristics, and generating treatment instructions, in real-time, invokes significant computation and memory needs for a control system 130. Indeed, in some cases, to perform all of those tasks before a farming machine 100 passes an identified plant is impossible. Managers of the farming machine 100 may accordingly configure various models 350 to operate at a lower fidelity than is computationally attainable to ensure that images are processed in time for treatment. However, in some situations, it may be beneficial for a manager to employ a high-fidelity model to aid in better achieving a farming objective.

As such, the performance estimation module 212 includes a report generation module 340. The report generation module 340 generates performance reports on a calibration pass of the farming machine 100 through the field. A performance report is an accounting of the expected performance characteristics of the farming machine 100 when employing various models 340 and various plant identification sensitivities. A calibration pass is a pass of the farming machine 100 through the field before it begins treating plants and captures representative images for generating a performance report.

IV.A Performing a Calibration Pass

The farming machine 100 performs a calibration pass to capture representative images of the field for generating a performance report. The calibration pass captures images of the field in a representative field portion. A representative field portion is one in which the operating environment is representative of where the farming machine will be taking farming actions to complete a farming objective. For example, if the farming objective is to spray weeds with a treatment fluid, the representative field portion is a portion in which the weed density is representative of the field.

The representative field portion may be selected in a variety of ways. In a first example, a manager of the farming machine drives the farming machine to the representative field portion and captures the representative images. In a second example, a manager may select a representative field portion on a client device and transmit the location of the representative field portion to the farming machine such that the farming machine may autonomously capture the representative images. In a third example, a manager may send a remote vehicle configured for capturing representative images on a calibration pass (e.g., a drone, a smaller machine, etc.). The remote vehicle may be configured with higher fidelity cameras than the farming machine 100.

Collecting, storing, and processing data collected on a calibration pass a challenging problem when generating a performance report using high-fidelity data and models. The farming machine may handle this situation in a variety of ways. In a first example, the farming machine may collect, store, and process the representative images locally using a control system 130 and local storage. In a second example, a manager of the farming machine may offload the representative images into a storage device (e.g., a portable computer hard drive), and translate the data to another system for subsequent processing. Translating representative images for processing may include sending (physically or electronically) the images to a remote system for processing using a control system with high power processing capabilities. In a third example, the manager may translate high power processing capabilities to the farming machine to process the representative images stored locally on the farming machine.

IV.B Generating a Performance Report

As described above, the report generation module 340 generates a performance report. A performance report is a quantification and/or visualization of expected performance characteristics for different models and/or plant identification sensitivities.

To generate the performance report, the report generation module 340 applies a high-fidelity plant identification model to the representative images to identify plants. In some examples, the high-fidelity model is a deeper model than the model used to generate real-time performance estimations. For instance, the high-fidelity model may be a bisenet model, a vision transformer-based model, or a high-resolution network with object contextual representation. When identifying plants, the high-fidelity model employs a plant identification sensitivity that gives an aggressive estimate of a performance characteristic (e.g., hit rate). In various examples, the estimate is dynamically determined using a softmax threshold value, or may employ a confidence threshold determined at implementation.

Typically, the high-fidelity model is too computationally expensive to identify plants and generate performance characteristics in real-time. That is, the high-fidelity model identifies plants slower than a threshold time and the real-time model identifies plants faster than the threshold time. The threshold time is the amount of time a model can use to identify a plant before treating the plant is impossible (because the farming machine travels past the plant). Conversely, the real-time model identifies plants faster than the threshold time. More simply, the high-fidelity model identifies plants in a longer amount of time, and the real-time model identifies plants in a shorter amount of time.

Additionally, the high-fidelity model may be trained with different data (more accurately labelled images, higher resolution images, etc.) than the real-time model. Further, the high-fidelity model may be an ensemble of models that, in aggregate, identify plants with a higher fidelity than the real-time plant identification models. Whatever the configuration of the high-fidelity model, the report generation module 340 uses the result of the high-fidelity model as a performance baseline for the performance report.

The report generation module 340 also applies one or more real-time plant identification models to the representative images to identify plants. The report generation module 340 uses the result of each real-time model as a performance variation for the performance report.

In some cases, some of the one or more real-time models are configured to employ a variety of plant identification sensitivities. In this case, the report generation module 340 applies each plant identification sensitivity of each real-time model to the representative images to identify plants. In this manner, the report generation module 340 generates a performance variation for each plant identification sensitivity of each plant identification model.

The report generation module 340 calculates performance characteristics for each real-time model by comparing each performance variation to the performance baseline. In this comparison, the performance baseline is considered the truth and the performance variation is considered the test. The performance results quantify how well each "test" performance variation identifies plants relative to the "truth" performance baseline.

To provide a simple example, a report generation module 340 generates a performance baseline using a high-fidelity model that identifies 12 weeds in a set of representative images. The report generation module 340 generates three performance variations using a real-time model, each of which is associated with a different plant identification sensitivity for the model. The first performance variation identifies 7 weeds, the second performance variation identifies 10 weeds, and the third performance variation identifies 12 weeds. As such, the report generation module 340 can quantify performance characteristics by comparing the performance variations to the performance baseline.

The report generation module 340 compiles all of the calculated performance characteristics for each real-time model into the performance report. The manager may utilize a performance report when selecting target performance characteristics for the farming machine in the field. That is, for example, in selecting which plant identification model and which plant identification sensitivity to employ when treating plants in the field with the farming machine.

In another example, the report generation module may also quantify cost savings.

Generating performance reports can employ the same methodologies as real-time calibration of performance characteristics when possible. There are many worthwhile, non-limiting examples, some of which are described herein.

In a first example, the report generation module 340 can generate performance results quantifying, e.g., accuracy, chemical usage, or economic value. For instance, an expected performance of the farming machine 100 over a calibration plot can be quantified in terms of weed hit rate. The report generation module 340 may compare the weed hit rate achieved by the real-time model at certain preselected values of sensitivity against the weed identifications of the high-fidelity model as described above. Based on the comparison, the report generation module can determine cost savings between the real-time and high-fidelity models (or any other compared models. Similarly, the chemical savings can be estimated for each of the sensitivity levels for the real-time model. To do so, the report generation module may replay a log file through the simulated system and determine how much spraying would occur at each setting. Given the weed hit rate and the savings at each sensitivity setting, the report generation module 340 can generate a report configured to empower an operator or manager with real data to drive decision making based on quantitative information regarding the weed hit rate and savings for a given sensitivity setting.

In a second example, the report generation module 340 can notify a manager of the performance characteristics in a similar manner as the characteristics module 320.

In a third example, the report generation module 340 can receive target performance characteristics from a manager. For instance, the report generation module 340 may receive a selection of the performance characteristics of a performance variation in the performance report as target performance characteristics for the farming machine.

In a fourth example, the report generation module 340 can recommend target performance characteristics to the manager based on the performance report. For instance, the report generation module 340 may access target performance characteristics from a database (e.g., a best practice target performance characteristics), and recommend performance characteristics of a performance variation in the performance report that would perform the same as, or similar to, the accessed target performance characteristics.

In a fifth example, the farming machine may capture additional images as it performs a subsequent farming pass in the field. The performance estimation module 212 may use a real-time model and its corresponding plant identification sensitivity that correspond to target performance characteristics selected from a performance report.

IV.C Example Implementation

Figure 6:
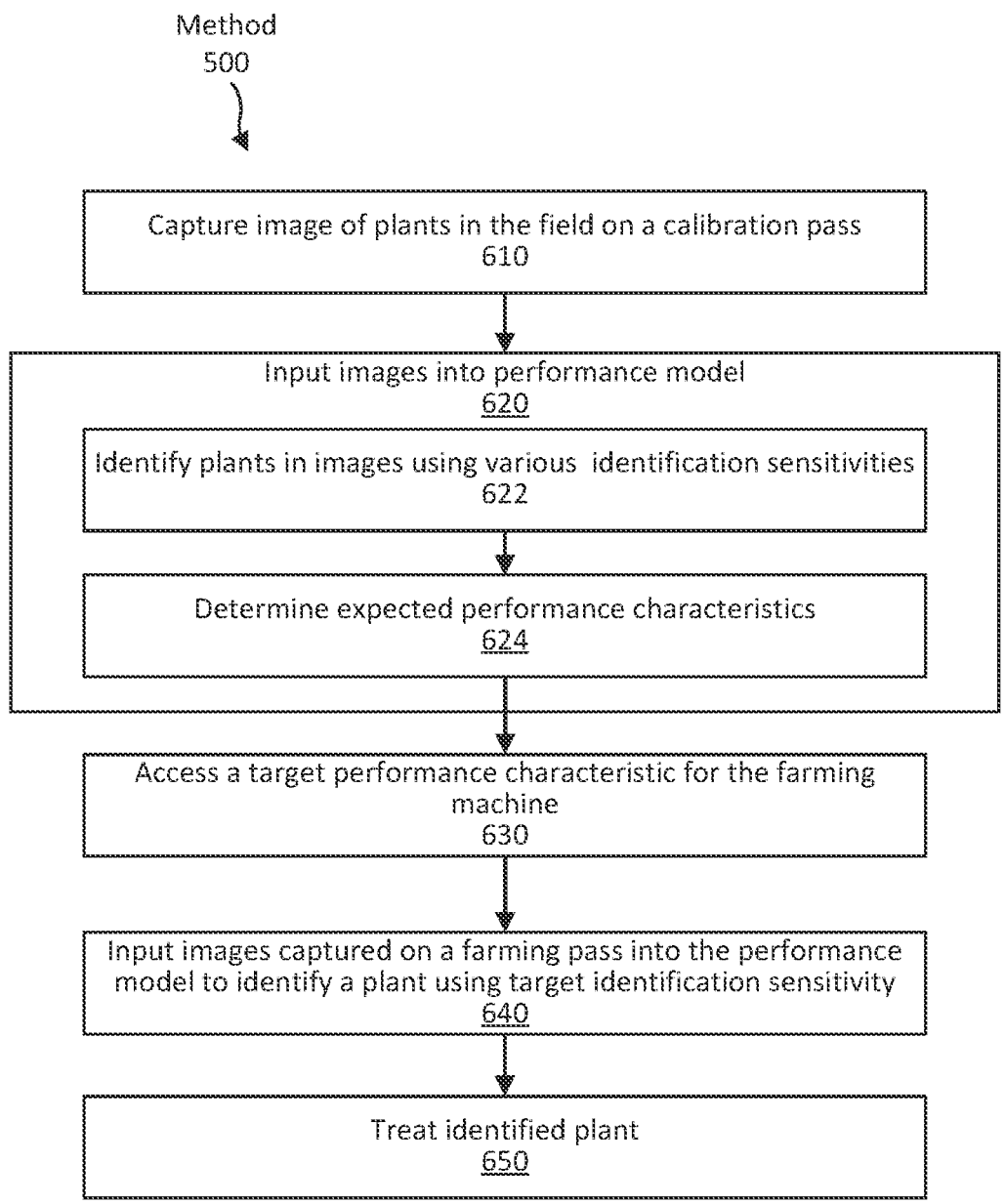
FIG. 6 illustrates an example method for calibrating performance characteristics of a farming machine using a performance report, according to one example embodiment.

FIG. 6 illustrates an example method for calibrating performance characteristics of a farming machine using a performance report, according to one example embodiment. The workflow 600 of the method is just an example. In various configurations, the workflow may include additional or fewer steps, or the steps may occur in a different order.

The farming machine (e.g., farming machine 100) captures 610 representative images of plants (e.g., plant 104) in a field (e.g., field 160) using a detection mechanism (e.g., detection mechanism 110) as it travels through the field on a calibration pass. The farming machine does not treat plants with a treatment mechanism (e.g., treatment mechanism 120) on the calibration pass.

A control system (e.g., control system 130) of the farming machine inputs 620 captured images into a performance model (e.g., model 440). The performance model includes a high-fidelity plant identification model (principal plant identification model) configured to identify plants at a high-fidelity plant identification sensitivity (principal plant identification sensitivity). The performance model also includes one or more real-time plant identification models (secondary plant identification model(s)) configured to identify plants. Each secondary plant identification model identifies plants with one or more plant identification sensitivities (secondary plant identification sensitives). The fidelity of each secondary plant identification sensitivity is lower than the fidelity of the principal plant identification sensitivity.

The control system processes the images using the performance model to identify 622 plants in the images. The control system may identify plants using both the principal plant identification model and the secondary plant identification model(s) using any number of the secondary identification sensitivities.

The control system processes the images using the performance model to determine 624 performance characteristics for each of the plant identification models and each of their plant identification sensitivities. To do so, the performance model may compare plant identification results of the primary plant identification model to results of the secondary plant identification model as described above. The control system includes the performance characteristics for each model and their plant identification sensitivities in the performance report. In that way, each performance characteristic in the performance report corresponds to a plant identification model and a plant identification sensitivity.

The control system accesses 630 a target performance characteristic for the farming machine from the performance report. For example, the control system may access the target performance characteristic over the network from a manager or may access the target performance characteristic from an input from a display in the farming machine.

The farming machine captures additional images of plants as it continues to travel through the field capturing images on a treatment pass. On a treatment pass the farming machine treats identified plants with treatment mechanisms.

The control system inputs 640 the additional captured images into the performance model to identify a plant in the additional images. In this case, the performance model employs the plant identification sensitivity corresponding to the target performance characteristic s The farming machine treats 650 the identified plant using a treatment mechanism of the farming machine.

V. Control System

Figure 7:
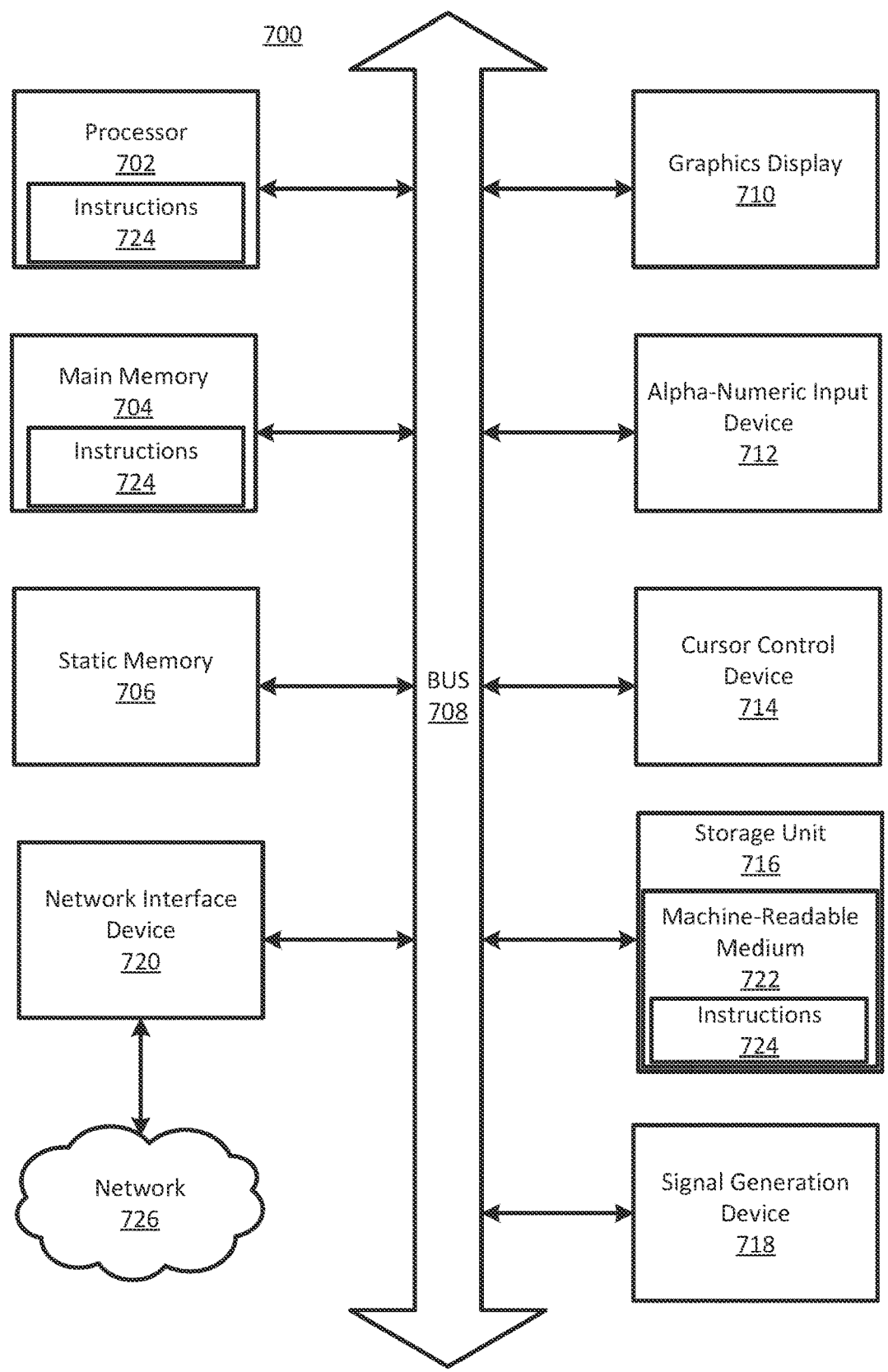
FIG. 7 is a block diagram illustrating components of an example machine for reading and executing instructions from a machine-readable medium.

FIG. 7 is a block diagram illustrating components of an example machine for reading and executing instructions from a machine-readable medium. Specifically, FIG. 7 shows a diagrammatic representation of control system 130 in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 55 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include the functionalities of modules of the system 130 described in FIG. 2. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 (e.g., network 240) via the network interface device 720.

VI. Additional Considerations

The description above refers to various modules and models capable of performing various algorithms and calculating various characteristics. Notably, the various models may take any number of forms. For instance, a single model can both identify plants in an image and calculate performance characteristics (e.g., using a single encoder and two decoders). Alternatively or additionally, a first model can identify plants and a second model can calculate performance characteristics (e.g., a first encoder and decoder, and a second encoder and decoder). Alternatively or additionally, each model is capable of modifying itself or another model according to the principles described hereinabove. For instance, a first result of a first model can modify a second model, or a model may modify itself based on its own results.

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for adjusting performance characteristics of a farming machine using a performance report, the method comprising:
    accessing images of plants in a field captured during a calibration pass of the farming machine through the field;
    generating the performance report for the farming machine by inputting the images into a performance model, the performance model configured to:
        identify plants in the images using a plurality of identification sensitivities;
        determine expected performance characteristics of the farming machine for each of the plurality of identification sensitivities, and
        wherein the performance report comprises expected performance characteristics for each of the plurality of identification sensitives;
    accessing a target performance characteristic for the farming machine from the performance report, the target performance characteristic an expected performance characteristic and a target identification sensitivity;
    inputting, into a plant identification model, additional images of plants in the field captured during a treatment pass of the farming machine through the field, the plant identification model identifying a plant in the field using the target identification sensitivity; and
    treating the plant in the field using a treatment array of the farming machine.

2. The method of claim 1, wherein determining expected performance characteristics of the farming machine comprises:
    inputting the images into a principal identification model configured to identify plants in the images at a principal identification sensitivity; and
    for each identification sensitivity of the plurality of identification sensitivities:
        inputting the images into a secondary identification model configured to identify plants in the images at the identification sensitivity, and determining the expected performance characteristics of the farming machine for the identification sensitivity by comparing the plants identified by the principal identification model at the principal identification sensitivity and the plants identified by the secondary identification model at the identification sensitivity.

3. The method of claim 2, wherein the plant identification model and the secondary identification model are a same model.

4. The method of claim 2, wherein the principal identification sensitivity of the principal identification model identifies plants at a first fidelity and the plurality of identification sensitivities identifies plants at a plurality of second fidelities, each of the plurality of second fidelities lower than the first fidelity.

5. The method of claim 2, wherein the principal identification model is configured to identify plants within a first time and the secondary identification model is configured to identify plants within a second time less than the first time.

6. The method of claim 5, wherein:
the first time is longer than a processing time,
the second time is shorter than the processing time, and
the processing time quantifies an expected time between identifying a plant in an image and a farming machine treating the plant as the farming machine travels in the field.

7. The method of claim 1, wherein accessing the target performance characteristic for the farming machine further comprises:
displaying, on a user interface of the farming machine, the performance report comprising expected performance characteristics of the farming machine for each of the plurality of identification sensitives; and
receiving, from the user interface of the farming machine, the target performance characteristic, wherein the target performance characteristic is one of the expected performance characteristics in the performance report.

8. The method of claim 1, wherein accessing the target performance characteristic for the farming machine further comprises:
transmitting, to a client device, the performance report comprising expected performance characteristics of the farming machine for each of the plurality of identification sensitives; and
receiving, from client device, the target performance characteristic, wherein the target performance characteristic is one of the expected performance characteristics in the performance report.

9. The method of claim 1, wherein determining the expected performance characteristics of the farming machine for each of the plurality of identification sensitivities further comprises:
for each identification sensitivity of the plurality of identification sensitivities,
determining an accuracy quantification for the identification sensitivity; and
determining a chemical usage quantification for the identification sensitivity.

10. The method of claim 1, wherein determining the expected performance characteristics of the farming machine for each of the plurality of identification sensitivities further comprises:
for each identification sensitivity of the plurality of identification sensitivities, determining an economic quantification for the identification sensitivity.

11. The method of claim 1, further comprising;
receiving, at a remote system, the images of plants in the field captured during the calibration pass of the farming machine through the field; and
wherein generating the performance report using the performance model occurs at the remote system.

12. The method of claim 1, wherein generating the performance report further comprises:
generating the performance report by processing the images using a processor on the farming machine; and
transmitting a notification to an operator of the farming machine that the performance report is complete.

13. A farming machine comprising:
an image detection system configured for capturing images of plants in a field as the farming travels through the field;
a treatment array configured to treat plants;
a processor;
a non-transitory computer readable storage medium storing computer program instructions for calibrating performance characteristics for the farming machine using a performance report, the computer program instructions, when executed by the processor, causing the processor to:
access images of plants in a field captured during a calibration pass of the farming machine through the field;
generate the performance report for the farming machine by inputting the images into a performance model, the performance model configured to:
identify plants in the images using a plurality of identification sensitivities;
determine expected performance characteristics of the farming machine for each of the plurality of identification sensitivities, and
wherein the performance report comprises expected performance characteristics for each of the plurality of identification sensitives;
access a target performance characteristic for the farming machine from the performance report, the target performance characteristic an expected performance characteristic and a target identification sensitivity;
input, into a plant identification model, additional images of plants in the field captured during a treatment pass of the farming machine through the field, the plant identification model identifying a plant in the field using the target identification sensitivity; and
treat the plant in the field using a treatment array of the farming machine.

14. The farming machine of claim 13, wherein executing the computer program instructions for determining performance characteristics of the farming machine further causes the processor to:
input the images into a principal identification model configured to identify plants in the images at a principal identification sensitivity; and
for each identification sensitivity of the plurality of identification sensitivities:
input the images into a secondary identification model configured to identify plants in the images at the identification sensitivity, and
determine the expected performance characteristics of the farming machine for the identification sensitivity by comparing the plants identified by the principal identification model at the principal identification sensitivity and the plants identified by the secondary identification model at the identification sensitivity.

15. The farming machine of claim 14, wherein the principal identification sensitivity of the principal identification model identifies plants at a first fidelity and the plurality of identification sensitivities identifies plants at a plurality of second fidelities, each of the plurality of second fidelities lower than the first fidelity.

16. The farming machine of claim 13, wherein the computer program instructions for accessing the target performance characteristic for the farming machine, when executed, further causes the processor to:
   display, on a user interface of the farming machine, the performance report comprising expected performance characteristics of the farming machine for each of the plurality of identification sensitives; and
   receive, from the user interface of the farming machine, the target performance characteristic, wherein the target performance characteristic is one of the expected performance characteristics in the performance report.

17. The farming machine of claim 13, wherein the computer program instructions for accessing the target performance characteristic for the farming machine further, when executed, further causes the processor to:
   transmit, to a client device, the performance report comprising expected performance characteristics of the farming machine for each of the plurality of identification sensitives; and
   receive, from client device, the target performance characteristic, wherein the target performance characteristic is one of the expected performance characteristics in the performance report.

18. The farming machine of claim 13, wherein the computer program instructions for accessing expected performance characteristics of the farming machine for each of the plurality of identification sensitivities, when executed, further causes the processor to:
   for each identification sensitivity of the plurality of identification sensitivities:
      determine an accuracy quantification for the identification sensitivity; and
      determine a chemical usage quantification for the identification sensitivity.

19. The farming machine of claim 13, wherein the computer program instructions for determining expected performance characteristics of the farming machine for each of the plurality of identification sensitivities, when executed, further causes the processor to:
   for each identification sensitivity of the plurality of identification sensitivities, determine an economic quantification for the identification sensitivity.

20. A non-transitory computer readable storage medium storing computer program instructions for calibrating performance characteristics for a farming machine using a performance report, the computer program instructions, when executed by a processor, causing the processor to:
   access images of plants in a field captured during a calibration pass of the farming machine through the field;
   generate the performance report for the farming machine by inputting the images into a performance model, the performance model configured to:
      identify plants in the images using a plurality of identification sensitivities;
      determine expected performance characteristics of the farming machine for each of the plurality of identification sensitivities, and
      wherein the performance report comprises expected performance characteristics for each of the plurality of identification sensitives;
   access a target performance characteristic for the farming machine from the performance report, the target performance characteristic an expected performance characteristic and a target identification sensitivity;
   input, into a plant identification model, additional images of plants in the field captured during a treatment pass of the farming machine through the field, the plant identification model identifying a plant in the field using the target identification sensitivity; and
   treat the plant in the field using a treatment array of the farming machine.

* * * * *